(12) United States Patent
Kuwabara et al.

(10) Patent No.: US 10,131,399 B2
(45) Date of Patent: Nov. 20, 2018

(54) POSITIONING STRUCTURE FOR FRONT WHEEL SUSPENSION DEVICE

(71) Applicant: HONDA MOTOR CO., LTD., Tokyo (JP)

(72) Inventors: Naoki Kuwabara, Wako (JP); Masayuki Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 15/263,098

(22) Filed: Sep. 12, 2016

(65) Prior Publication Data

US 2017/0088230 A1     Mar. 30, 2017

(30) Foreign Application Priority Data

Sep. 29, 2015 (JP) ................................. 2015-192016

(51) Int. Cl.
| | | |
|---|---|---|
| *B62K 21/20* | (2006.01) | |
| *B62K 21/02* | (2006.01) | |
| *B62K 25/08* | (2006.01) | |
| *B62K 25/24* | (2006.01) | |
| *B62K 21/18* | (2006.01) | |

(52) U.S. Cl.
CPC .............. *B62K 21/20* (2013.01); *B62K 21/02* (2013.01); *B62K 21/18* (2013.01); *B62K 25/08* (2013.01); *B62K 25/24* (2013.01)

(58) Field of Classification Search
CPC ........ B62K 21/20; B62K 21/02; B62K 21/18; B62K 25/08; B62K 25/24
See application file for complete search history.

(56) References Cited

U.S. PATENT DOCUMENTS

| | | | | | |
|---|---|---|---|---|---|
| 4,179,135 | A | * | 12/1979 | Slater ..................... | B62K 25/24 280/276 |
| 4,785,905 | A | * | 11/1988 | Trema .................. | B62K 21/005 180/219 |
| 5,441,291 | A | * | 8/1995 | Girvin, III ............. | B62K 25/24 267/293 |
| 6,263,994 | B1 | * | 7/2001 | Eitel ........................ | B60T 5/00 180/219 |

(Continued)

FOREIGN PATENT DOCUMENTS

| | | | | |
|---|---|---|---|---|
| JP | 04-169386 | | 6/1992 | |
| WO | WO-2014089607 A1 | * | 6/2014 | ............. B60G 3/185 |

*Primary Examiner* — Jacob D Knutson
*Assistant Examiner* — Marlon A Arce
(74) *Attorney, Agent, or Firm* — Rankin, Hill & Clark LLP

(57) ABSTRACT

To achieve steering angle adjustment on a steering part side and a front wheel side, a positioning structure includes: a first engagement part for engaging the steering part and a body frame with each other at a first steering angle that is an angle about a first steering axis at the time of assembling the vehicle; a second engagement part for engaging a fork and a fork holder at a second steering angle that is an angle about a second steering axis at the time of assembling the vehicle; and a linking mechanism for linking the first engagement part and the second engagement part to each other. The linking mechanism is provided with a steering adjusting mechanism for putting the first engagement part into engagement by adjusting the first steering angle and for putting the second engagement part into engagement by adjusting the second steering angle.

20 Claims, 7 Drawing Sheets

(56) References Cited

U.S. PATENT DOCUMENTS

| | | | | |
|---|---|---|---|---|
| 7,784,809 B2* | 8/2010 | Heyl | ................... | B62K 25/24 |
| | | | | 280/276 |
| 7,896,379 B2* | 3/2011 | Nagao | ................... | B62K 25/24 |
| | | | | 280/276 |
| 8,162,342 B2* | 4/2012 | Chen | ................... | B62K 25/24 |
| | | | | 280/276 |

* cited by examiner

POSITIONING STRUCTURE FOR FRONT WHEEL SUSPENSION DEVICE

BACKGROUND OF THE INVENTION

Field of the Invention

The present invention relates to a positioning structure for a front wheel suspension device.

Description of Related Art

Conventionally, as a front wheel suspension device of a saddle type vehicle, there has been, for example, one that is disclosed in Japanese Patent Laid-Open No. Hei 4-1693861. In this front wheel suspension device, a handle and a front wheel suspension member are interlinked through an L-shaped bending and stretching link mechanism. The bending and stretching link mechanism is so configured that upper and lower links are bent and stretched according to vertical movements of a front wheel, whereby the handle and the front wheel suspension member are interlinked in such a manner as to enable steering even when the front wheel is moved up and down.

Meanwhile, in such a front wheel suspension device as above, it is necessary to perform steering angle adjustment such that the steering angle on the handle side and the steering angle on the front wheel side coincide with each other. Since the steering angle adjustment requires a large number of working steps, there has been a need to reduce the number of working steps.

SUMMARY OF THE INVENTION

In view of the above, it is an object of the present invention to provide a positioning structure for a front wheel suspension device including a fork that supports an axle of a front wheel, a fork holder that supports the fork in such a manner as to enable steering and is supported on a body frame, and a steering part that is supported on the body frame in such a manner as to enable steering, wherein steering angle adjustment is performed on the steering part side and the front wheel side with a simple configuration at the time of assembling the vehicle.

In accordance with a first aspect of the present invention, there is provided a positioning structure for a front wheel suspension device including a fork that supports an axle of a front wheel, a fork holder that supports the fork so as to enable steering and is supported on a body frame, and a steering part that is supported on the body frame so as to enable steering, wherein the fork is steerable about a second steering axis that is offset to a front side of a first steering axis that is a rotational axis of the steering part, the positioning mechanism includes: a first engagement part that engages the steering part and the body frame with each other at a first steering angle that is an angle about the first steering axis; a second engagement part that engages the fork and the fork holder with each other at a second steering angle that is an angle about the second steering axis; and a linking mechanism that links the first engagement part and the second engagement part to each other, the linking mechanism being provided with a steering adjusting mechanism that puts the first engagement part into engagement by adjusting the first steering angle and puts the second engagement part into engagement by adjusting the second steering angle. This ensures that steering angle adjustment can be performed such that the steering angle relevant to the first engagement part and the steering angle relevant to the second engagement part coincide with each other at the time of assembling the vehicle. Therefore, it is unnecessary to perform the adjustment by use of an angle gauge or the like, and the number of working steps can be reduced. Accordingly, steering angle adjustment on the steering part side and the front wheel side can be carried out with a simple configuration at the time of assembling the vehicle.

In accordance with a second aspect of the present invention, the above-mentioned positioning structure for the front wheel suspension device has a configuration wherein the first engagement part includes a steering part side engaging part formed in the steering part, and a body frame side engaging part formed in the body frame, the steering part side engaging part is formed with a steering part side insertion part in and through which a first insertion member can be inserted and passed, and the body frame side engaging part is formed with a body frame side insertion part in and through which the first insertion member can be inserted and passed. This enables steering angle adjustment to be achieved by only inserting and passing the first insertion member in and through the steering part side insertion part and the body frame side insertion part. Therefore, workability in assembling the vehicle can be enhanced. In addition, even in the case where the steering part is formed with the steering part side engaging part, the steering part side engaging part can be reduced in size and weight.

In accordance with a third aspect of the present invention, the above-mentioned positioning structure for the front wheel suspension device has a configuration wherein at the first steering angle, the steering part side insertion part and the body frame side insertion part communicate with each other in a vertical direction. This causes the first insertion member to be inserted in and passed through the steering part insertion part and the body frame side insertion part by its own weight when the steering part side insertion part and the body frame side insertion part overlap with each other in the vertical direction at the time of steering angle adjustment. Therefore, the workability in assembling the vehicle can be further enhanced. Besides, since the first insertion member is inserted in and passed through the steering part side insertion part and the body frame side insertion part by its own weight, the assembling operation can be carried out efficiently even in the case where the vehicle body is located at a high position, such as on a manufacturing base, and where the steering angle side insertion part and the body frame side insertion part cannot be visually observed.

In accordance with a fourth aspect of the present invention, the above-mentioned positioning structure for the front wheel suspension device has a configuration wherein the body frame side engaging part is formed with a body frame side sliding part that allows sliding of the first insertion member until the first insertion member is inserted in and passed through the body frame side insertion part. This ensures that even in the case where a misalignment is generated between the steering part side insertion part and the body frame side insertion part at the time steering angle adjustment, the first insertion member can slide until the misalignment is eliminated. Therefore, the workability in assembling the vehicle can be enhanced further.

In accordance with a fifth aspect of the present invention, the above-mentioned positioning structure for the front wheel suspension device has a configuration wherein the second engagement part includes a fork side engaging part formed in the fork, and a fork holder side engaging part formed in the fork holder, the fork side engaging part is formed with a fork side insertion part in and through which a second insertion member can be inserted and passed, and the fork holder side engaging part is formed with a fork holder side insertion part in and through which the second insertion member can be inserted and passed. This enables steering angle adjustment to be achieved by only inserting and passing the second insertion member in and through the fork side engaging part and the fork holder side engaging part. Consequently, workability in assembling the vehicle can be enhanced.

In accordance with a sixth aspect of the present invention, the above-mentioned positioning structure for the front wheel suspension device has a configuration wherein at the second steering angle, the fork side insertion part and the fork holder side insertion part communicate with each other in a vertical direction. This causes the second insertion member to be inserted in and passed through the fork side insertion part and the fork holder side insertion part under its own weight when the fork side insertion part and the fork holder side insertion part overlap with each other in the vertical direction at the time of steering angle adjustment. Therefore, the workability in assembling the vehicle can be further enhanced. In addition, since the second insertion member is inserted in and passed through the fork side insertion part and the fork holder side insertion part by its own weight, the assembling operation can be carried out efficiently even in the case where the vehicle body is located at a high position, such as on a manufacturing base, and where the fork side insertion part and the fork holder side insertion part cannot be visually observed.

In accordance with a seventh aspect of the present invention, the fork side engaging part is formed with the fork side sliding part which allows sliding of the second insertion member until the second insertion member is inserted in and passed through the fork side insertion part. This ensures that even in the case where a misalignment is generated between the fork side insertion part and the fork holder side insertion part at the time of steering angle adjustment, the second insertion member can slide until the misalignment is eliminated. Therefore, the workability in assembling the vehicle can be further enhanced.

In accordance with an eighth aspect of the present invention, the above-mentioned positioning structure for the front wheel suspension device has a configuration wherein the fork side insertion part is disposed at a center in a vehicle width direction of the fork side sliding part extending in the vehicle width direction. This ensures that even in the case where the fork side insertion part is deviated to one side in the vehicle width direction in relation to the fork holder side insertion part at the time of steering angle adjustment, the second insertion member can slide in the vehicle width direction until the deviation is eliminated. Consequently, the workability in assembling the vehicle can be further enhanced.

In accordance with a ninth aspect of the present invention, the above-mentioned positioning structure for the front wheel suspension device has a configuration wherein the fork holder is formed with a fork holder side steering limiting part that limits a steering angle of the fork, and the fork side engaging part is formed with a fork side steering limiting part capable of contacting the fork holder side steering limiting part. This makes it possible to provide the fork side engaging part with a function of a so-called handle stopper for limiting the steering angle of the fork. Therefore, it is unnecessary to separately provide a handle stopper. Consequently, a simplified device structure can be realized.

In accordance with a tenth aspect of the present invention, the above-mentioned positioning structure for the front wheel suspension device has a configuration wherein the fork side steering limiting part is disposed at each of both end portions in the vehicle width direction of the fork side engaging part extending in the vehicle width direction. This ensures that even in the case where the fork side steering limiting part receives a load when contacting the fork holder side steering limiting part, the load can be received by both end portions in the vehicle width direction of the fork side engaging part. Therefore, strength as a handle stopper can be secured.

In accordance with an eleventh aspect of the present invention, the above-mentioned positioning structure for the front wheel suspension device has a configuration wherein the steering adjusting mechanism includes a first link member that extends along a longitudinal vehicle direction on one side in the vehicle width direction and interlinks the steering part and the fork holder, and the first link member can be contracted and expanded in such a manner as to enable adjustment of at least one of the first steering angle and the second steering angle. This ensures that at the time of steering angle adjustment, steering adjustment (for example, absorption of a misalignment due to assemblage or the like) can be achieved by only contracting or expanding the first link member. Therefore, it is possible to realize a simple adjusting mechanism and to further enhance the workability in assembling the vehicle.

In accordance with a twelfth aspect of the present invention, the above-mentioned positioning structure for the front wheel suspension device has a configuration wherein the steering adjusting mechanism further includes a second link member that extends in parallel to a longitudinal direction of the first link member on other side in the vehicle width direction and interlinks the steering part and the fork holder, the second link member is provided with a steering side link part linked to the steering part, and a fork holder side link part linked to the fork holder, and at least one of connection between the steering side link part and the steering part and connection between the fork holder side link part and the fork holder is performed in a rubber mount mode. This ensures that at the time of steering angle adjustment, the first link member can be supported (for example, a misalignment due to assemblage or the like can be absorbed by flexure of rubber) by the second link member while performing the steering adjustment by the first link member. Consequently, it is possible to effectively carry out the steering adjustment and to further enhance the workability in assembling the vehicle.

BRIEF DESCRIPTION OF THE DRAWINGS

These and further features of the invention will be apparent with reference to the following description and drawings, wherein.

DETAILED DESCRIPTION OF THE INVENTION

Figure 1:
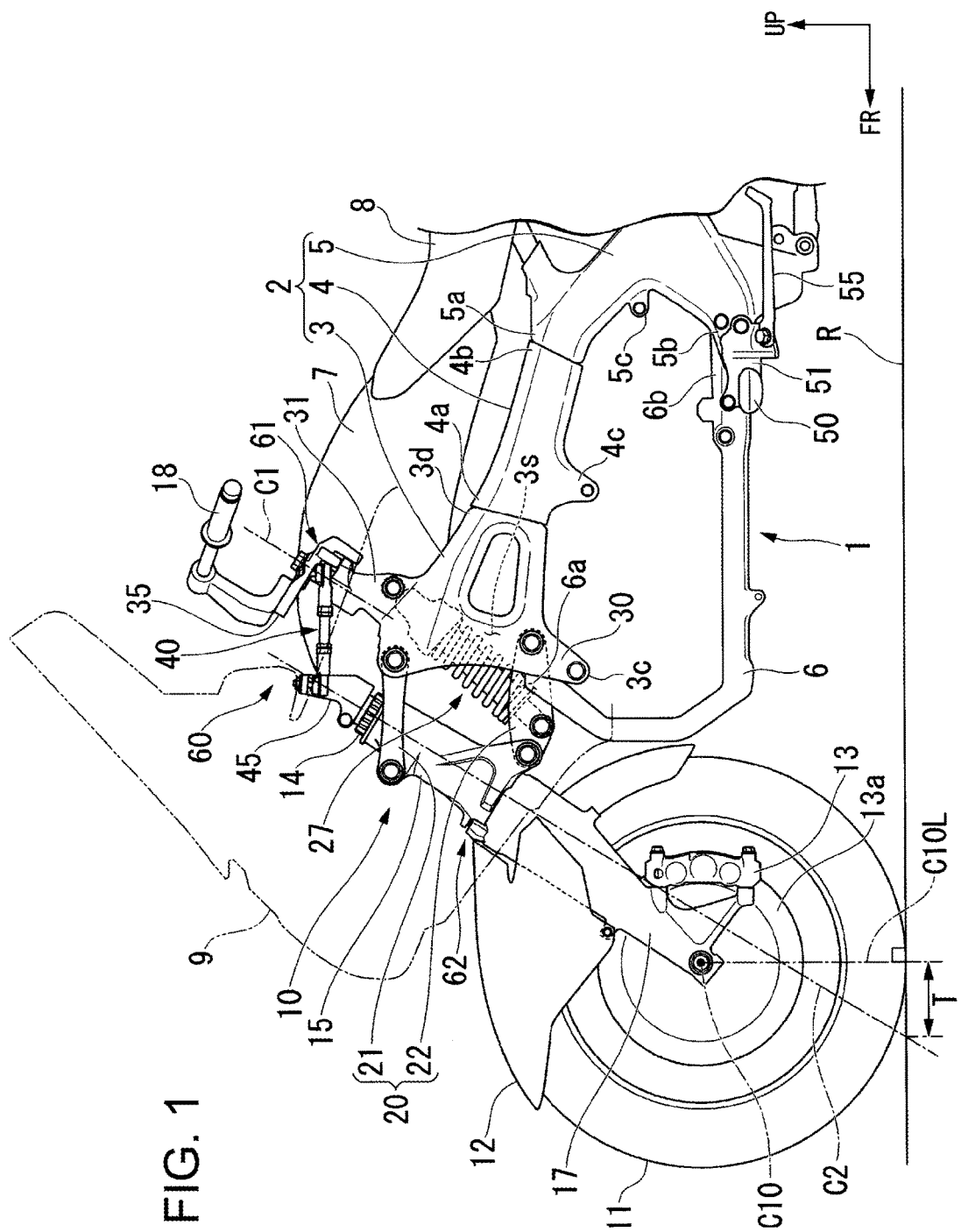
FIG. 1 is a perspective view of a vehicle body front part of a motorcycle in an embodiment of the present invention.

An embodiment of the present invention will be described below referring to the drawings. Note that the directions such as front, rear, left and right are the same as the directions in regard of a vehicle described below, unless specified otherwise. In addition, at suitable parts of the drawings used in the following description, there are shown an arrow FR indicative of the vehicle front side, an arrow LH indicative of the vehicle left-hand side, an arrow UP indicative of the vehicle upper side, and a center line CL across the transverse direction of the vehicle.

FIG. 1 shows a vehicle front part of a motorcycle as an example of a saddle type vehicle. Referring to FIG. 1, a body frame 1 of the motorcycle includes left and right main frames 2, each of which has a front block 3 supporting a front wheel suspension device 10 at a front end portion thereof. Note that symbol 2L in FIG. 3 indicates the left main frame, and symbol 2R indicates the right main frame. In addition, symbol 3L in FIG. 3 indicates the left front block, and symbol 3R indicates the right front block.

The left and right main frames 2 each integrally have the front block 3 so shaped as to have a larger width across the longitudinal vehicle direction on the more front side, a pivot part 5 that is formed in a V shape opening forward to have a larger width across the longitudinal vehicle direction on the more front side and which supports a rear wheel suspension device (not shown), and a link part 4 that extends from a rear end 3d of the front block 3 while gently slanting to be lower on the more rear side and that interconnects the rear end 3d of the front block 3 and a front upper end 5a of the pivot part 5. Note that the vertical width of a front end 4a of the link part 4 is substantially the same as the vertical width of the rear end 3d of the front block 3, and the vertical width of a rear end 4b of the link part 4 is substantially the same as the vertical width of the front upper end 5a of the pivot part 5.

The body frame 1 further includes left and right lower frames 6 that are each J-shaped in side view. The lower frame 6 extends forward on the lower side of the vehicle from a front lower end portion 5b of the pivot part 5 located on the rear side of the main frame 2, and extends toward the upper side on the vehicle front side to reach a front lower end portion of the front block 3. Note that symbol 6L in FIG. 3 indicates the left lower frame, and symbol 6R indicates the right lower frame.

In a space surrounded by the main frames 2 and the lower frames 6, there is mounted, for example, an engine (not shown). A fuel tank 7 is disposed on the upper side of the front blocks 3 and the link parts 4. A seat 8 is disposed on the upper side of the pivot parts 5. A vehicle body front portion of the motorcycle is covered with a front cowl 9 formed of synthetic resin.

Figure 3:
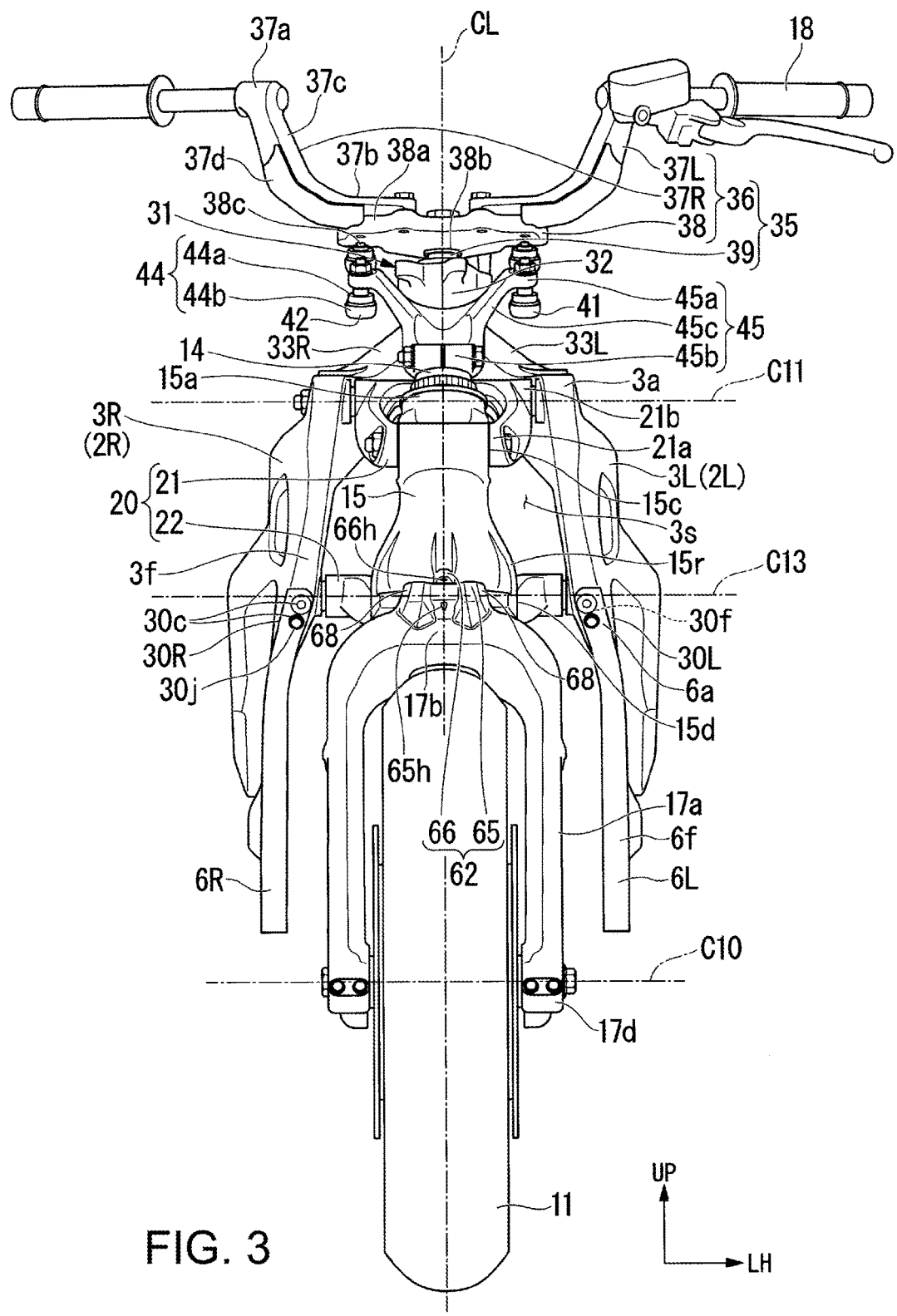
FIG. 3 is a front view of the front wheel suspension device.

Referring also to FIG. 3, the front block 3 is in a gate-like shape (inverted V shape) opening downward to be narrower in left-right width on the more upper side in front view. A lower opening portion of the gate-like shape of the front block 3 is denoted by symbol 3s.

Figure 6:
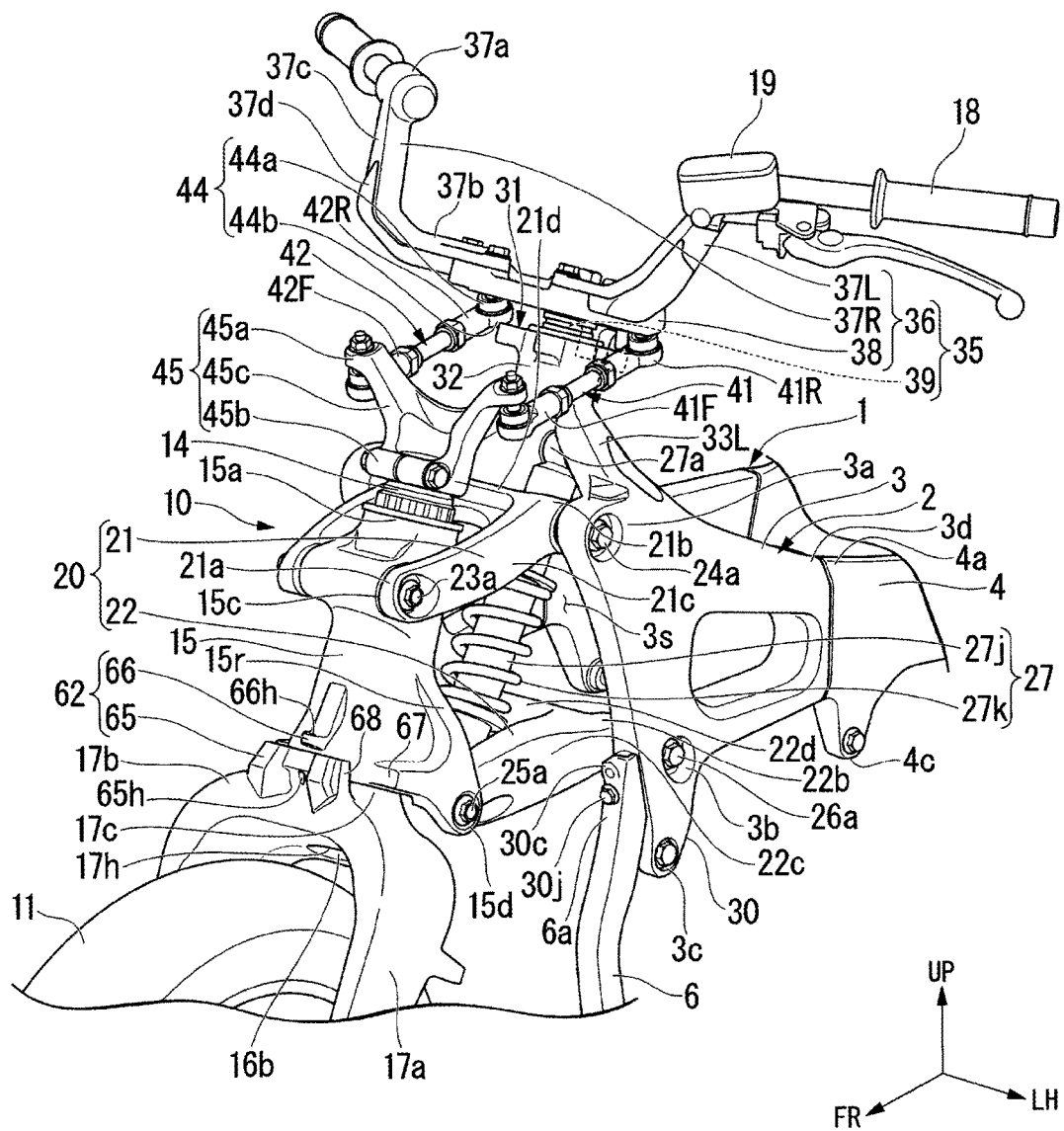
FIG. 6 is a perspective view of the front wheel suspension device as viewed from a left front side.

Referring also to FIG. 6, the front block 3 is formed at its front upper end portion with an upper connection part 3a to which a rear end portion 21b of an upper arm 21 is connected. At a front upper portion of the front block 3 and on the rear side of the upper connection part 3a, a handle support part 31 for supporting a bar handle 18 (handle) is formed to extend toward a rear upper side. At a front lower portion of the front block 3, an extension part 30 extending toward a front lower side is formed. Note that symbol 30L in FIG. 3 denotes the left extension part, and symbol 30R denotes the right extension part.

The extension part 30 is formed with a lower connection part 3b to which a rear end portion 22b of a lower arm 22 is connected, and a front upper portion 6a of the lower frame 6 is connected to the extension part 30. The extension parts 30 are formed at their lower end portions with lower support parts 3c by which left and right side portions of a front upper portion of the engine are supported. Left and right side portions of a longitudinally central upper portion of the engine are supported by support parts 4c of the link parts 4, and left and right side portions of a rear portion of the engine are supported by support parts 5c of the pivot parts 5. Note that the lower frames 6 may support the engine.

Front end portions 6f of the left and right lower frames 6L and 6R, in front view, extend rectilinearly upward from the vehicle lower side, and then extend slantly so as to be located more central in the transverse direction (vehicle width direction) on the more upper side, to reach the front upper portions 6a. The front upper portions 6a of the left and right lower arms 6L and 6R overlap with front portions 30f of the left and right extension parts 30L and 30R in front view. The front portions 30f of the left and right extension parts 30L and 30R, in front view, extend slantly so as to be more central in the transverse direction on the more upper side. The front end portions 3f of the left and right front blocks 3L and 3R, in front view, are connected to upper ends of the front portions 30f of the left and right extension parts 30L and 30R, and are gently slanted so as to be located more central in the transverse direction on the more upper side.

The front upper portions 6a of the lower frames 6 are joined to the front portions 30f of the extension parts 30. The front portions 30f of the extension parts 30 are formed with joint parts 30c to which the front upper portions 6a of the lower frames 6 are joined. To the joint parts 30c, the front upper portions 6a of the lower frames 6 are joined by bolts 30j serving as fastening means for fastening from the vehicle front side.

The bolts 30j, in front view, are provided in plurality and in the state of being offset in the vertical direction and the left-right direction. In this embodiment, the bolts 30j in the front view are provided at the joint parts 30c of the left and right extension parts 30L and 30R in twos (four in total) in the state of being offset in the vertical direction and the left-right direction. In FIG. 3 and the like, for convenience, of the four bolts 30j, one bolt 30j each (two in total) is shown in the state of being offset in the downward direction and the left-right direction in front view. Note that the bolts 30j may be provided in plurality in three or more.

Note that symbol 50 in FIG. 1 denotes a step, symbol 51 denotes a step support member for supporting the step 50, and symbol 55 denotes a side stand.

Referring to FIGS. 1 and 6 together, the front wheel suspension device 10 includes: a fork 17 (specifically, a front fork) supporting a front wheel 11 on lower end portions thereof; a handle post 35 (steering part) rotatably supported on a handle support part 31 and rotated about a first steering axis C1 attendant on an operation of the bar handle 18; a fork holder 15 supporting the fork 17 such that the fork 17 can be rotated about a second steering axis C2; left and right link members 41 and 42 and a steering member 45 that are interlinked between the handle post 35 and the fork holder 15; a support arm 20 having upper and lower arms 21 and 22 extending in the longitudinal vehicle direction and supporting the front wheel 11 such that the front wheel 11 can be oscillated vertically; and a cushion member 27 for providing a cushioning action by contracting/expanding attendant on movements of the front wheel 11. Rotation about the first steering axis C1 attendant on an operation of the bar handle 18 and steering of the front wheel 11 are linked to each other through the handle post 35, the left and right link members 41 and 42, the steering member 45, the fork holder 15 and the fork 17. In other words, the handle post 35, the left and right link members 41, 42, the steering member 45, the fork holder 15 and the fork 17 form a linking mechanism 60 for linking a first engagement part 61 and a second engagement part 62 (described hereinafter) to each other. In addition, the left and right link members 41 and 42 (the left link member 41 and the right link member 42) form a steering adjusting mechanism 40, which will be described later. Note that the left link member 41 corresponds to the "second link member" described in the claims, and the right link member 42 corresponds to the "first link member" described in the claims.

Here, the first steering axis C1 is a rotational axis of the handle post 35 rotated attendant on an operation of the bar handle 18, and coincides with a center axis of a hollow cylindrical boss part 32 of the handle support part 31. The second steering axis C2 is a rotational axis of the fork 17 rotated attendant on an operation of the bar handle 18, and coincides with a center axis of the fork holder 15. The angle of the second steering axis C2 relative to the vertical direction is a "caster angle." The second steering axis C2 is offset to the front side of the first steering axis C1 in side view. The second steering axis C2 and the first steering axis C1 are substantially parallel to each other.

Figure 2:
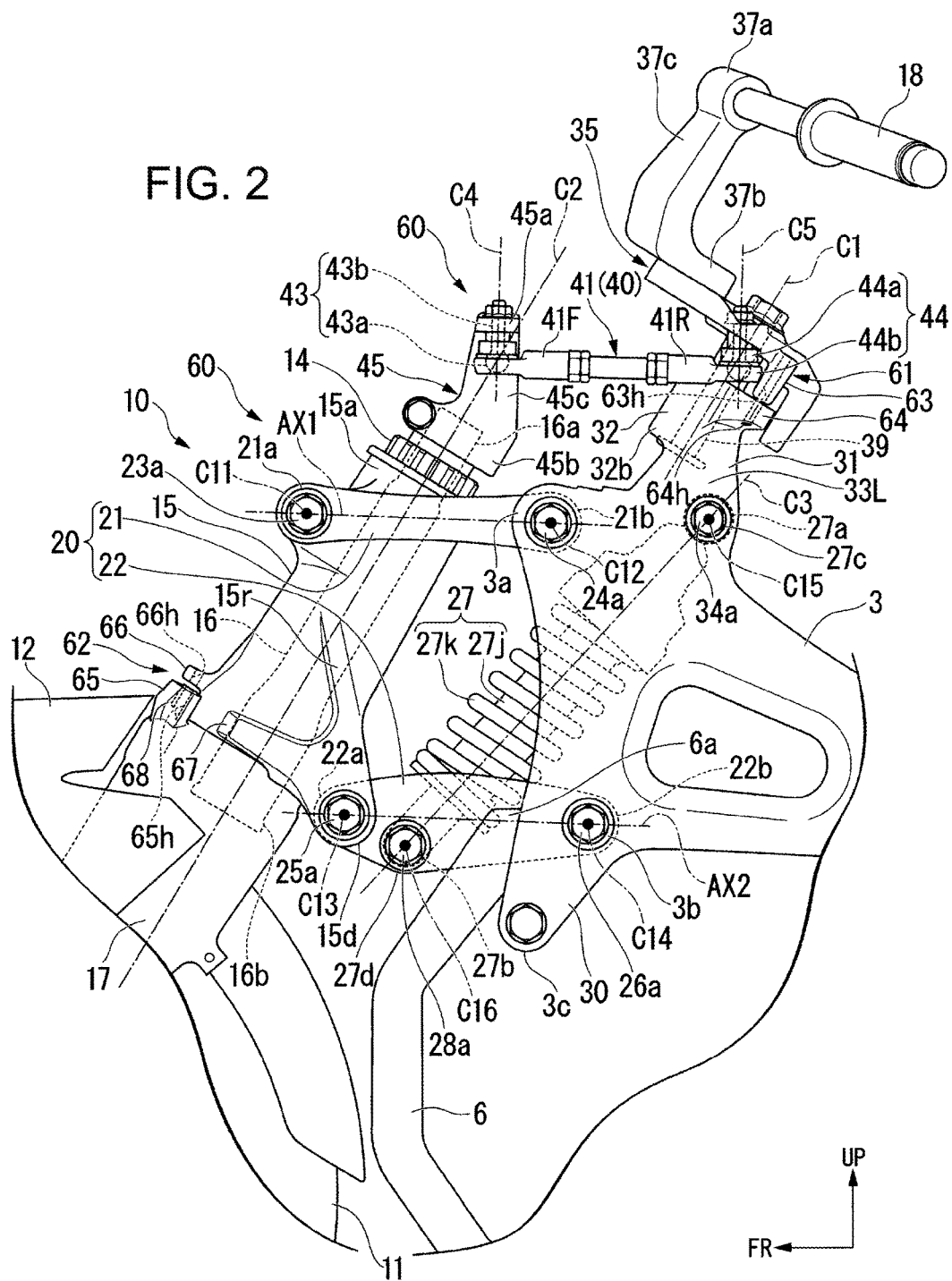
FIG. 2 is a left side view of a front wheel suspension device of the motorcycle.

Referring to FIGS. 2 and 3 together, the fork 17 integrally has a shaft part 16 forming the second steering axis C2, left and right arm parts 17a extending vertically, and a cross member 17b interconnecting upper end portions of the left and right arm parts 17a. The left and right arm parts 17a are disposed on both the left and right sides of the front wheel 11. The cross member 17b is curved inward in the vehicle width direction so as to be along a tread surface at an upper end position of the front wheel 11, and is disposed between the upper end portions of the left and right arm parts 17a. Left and right end portions of the cross member 17b are joined to the upper end portions of the left and right arm parts 17a. The components of the fork 17 are, for example, integral component parts made of aluminum, and are integrally welded to one another.

The shaft part 16 of the fork 17 is supported on the hollow cylindrical fork holder 15 on the radially inner side of the fork holder 15 in such a manner as to be rotatable about the second steering axis C2. An upper end portion 16a of the shaft part 16 is connected to the steering member 45.

Referring also to FIG. 6, the cross member 17b is formed at its upper end portion with a shaft support part 17c to which a lower end portion 16b of the shaft part 16 is connected. The shaft support part 17c of the cross member 17b is formed therein with an insertion hole 17h opening in the direction in which the shaft part 16 extends. In a condition wherein the shaft part 16 is inserted in the insertion hole 17h starting from the upper end portion 16a and the lower end portion 16b of the shaft part 16 is located in the insertion hole 17h, the lower end portion 16b of the shaft part 16 and the shaft support part 17c are welded to each other, whereby the upper end portion of the cross member 17b is fixed to the lower end portion 16b of the shaft part 16.

Referring also to FIG. 3, an axle of the front wheel (hereinafter referred to as the "front wheel axle") is connected to lower end portions 17d of the left and right arm parts 17a. For example, both end portions in the vehicle width direction of the front wheel axle are fixed to the lower end portions 17d of the left and right arm parts 17a through ball bearings (not shown). A front fender 12 (see FIG. 1) is supported on the cross member 17b through bolts (not shown). For convenience, in FIGS. 3 and 6, the front fender 12 and the like are omitted from the drawing.

Note that symbol 13 in FIG. 1 denotes a brake caliper. In addition, symbol 13a denotes a brake rotor. Besides, symbol C10 denotes a center axis of the front wheel axle. In addition, symbol C10L denotes a perpendicular from the center axis C10 to a road surface R. Besides, symbol T denotes a caster offset (trail).

Referring also to FIG. 2, the handle support part 31 is provided to be slanted rearward relative to the vertical direction, at a front upper end portion of the front block 3, in side view. The handle support part 31 is provided integrally at upper end portions of the front blocks 3 made of aluminum, for example. The handle support part 31 supports the handle post 35 such that the handle post 35 can be rotated (steering can be performed).

Referring to FIGS. 2 and 3 together, specifically, the handle support part 31 is composed of: a cylindrical boss part 32 forming the first steering axis C1; and left and right extension parts 33L and 33R which extend rearwardly upward from front upper end portions of the front blocks 3 so as to be located on a transversely more inner side on the more upper side and join a lower end portion 32b (lower portion) of the boss part 32. At the left and right extension parts 33L and 33R, there is provided a bolt 34a as a link shaft that extends in the transverse direction to interlink the left and right extension parts 33L and 33R. The left and right extension parts 33L and 33R are formed with a cushion upper connection part 27c to which an upper end portion 27a of the cushion member 27 is connected. At an upper end portion of the boss part 32, the handle post 35 is provided so as to be rotatable about the first steering axis C1.

Figure 4:
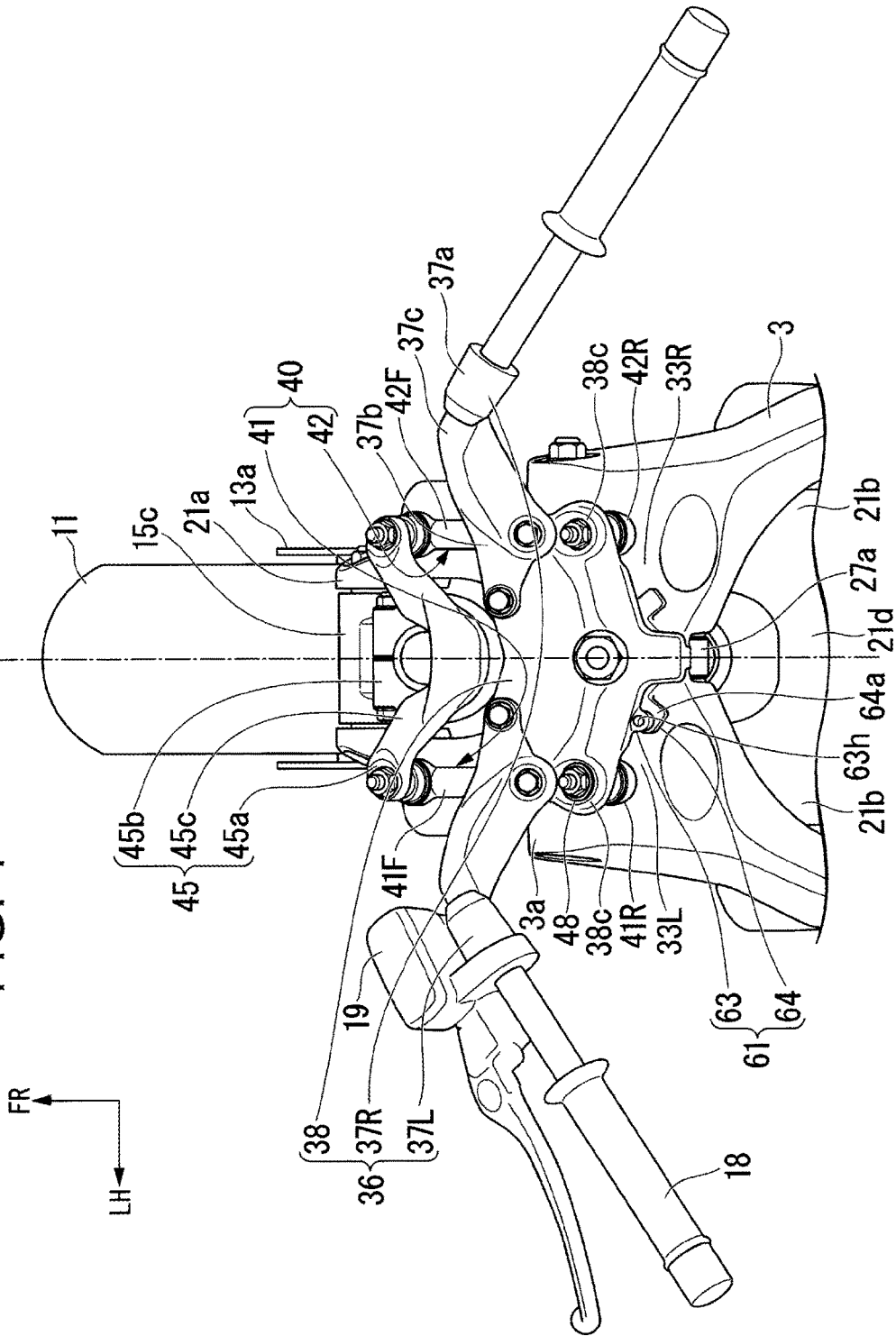
FIG. 4 is a perspective view of the front wheel suspension device as viewed from a rear upper side.

The handle post 35 is composed of a holder 36 to which the bar handle 18 is fixed, and a hollow cylindrical shaft part 39, which joins a lower portion of the holder 36 and has the first steering axis C1 as a center axis thereof. Referring also to FIG. 4, the holder 36 includes: a base part 38 that has a thickness in a direction parallel to the first steering axis C1 and is in a sector shape larger in left-right width on the more front side; and left and right extension parts 37L and 37R that are connected to left and right end portions of the base part 38 and extend toward a rear upper side while assuming an L shape in side view.

Referring also to FIG. 3, the shaft part 39 is supported by the boss part 32 on a radially inner side of the boss part 32 so as to be rotatable about the first steering axis C1. A rear portion 38b of the base part 38 is welded to an upper end portion of the shaft part 39. The base part 38 is formed at its left and right lower surfaces with link rear connection parts 38c to which rear end portions of the pair of left and right link members 41 and 42 are connected.

Referring also to FIG. 2, the left and right extension parts 37L and 37R each integrally have a handle connection part 37a to which a transversely inside end portion of the bar handle 18 is connected, a first extension part 37b which is connected to one of left and right end portions 38a of the base part 38 and extends forwardly upward in side view so as to be along the inclination of the base part 38, and a second extension part 37c which extends rearwardly upward from a front upper end of the first extension part 37b to join the handle connection part 37a. Note that symbol 37d in FIG. 3 denotes a gusset provided ranging over the first extension part 37b and the second extension part 37c. With the gusset 37d thus provided ranging over the first extension part 37b and the second extension part 37c, the left and right extension parts 37L and 37R can be reinforced.

The bar handle 18 and the left and right extension parts 37L and 37R are, for example, component parts made of aluminum, and are integrally welded to one another. For instance, the bar handle 18 has separate handles that are divided to the left and right sides in the transverse direction, and transversely inside portions of the left and right separator handles are welded to the handle connection parts 37a of the left and right extension parts 37L and 37R. Note that a configuration may be adopted wherein the handle connection parts 37a are each formed therein with an insertion hole along the transverse direction, and the transversely inside portions of the left and right separator handles are press fitted into the insertion holes, whereby the bar handle 18 and the left and right extension parts 37L and 37R are united with one another.

Referring also to FIG. 4, the second extension parts 37c of the left and right extension parts 37L and 37R are fastened to left and right end portions 38a of the base part 38 by a plurality (for example, in this embodiment, two on each of the left and right sides) of fastening members (bolts). Note that the second extension parts 37c of the left and right extension parts 37L and 37R may be welded to the left and right end portions 38a of the base part 38.

With the shaft part 39 of the handle post 35 supported by the boss part 32 in a rotatable manner, the handle post 35 can be rotated (steering can be performed) about the first steering axis C1 attendant on an operation of the bar handle 18.

Note that symbol 19 in FIG. 4 denotes a switch box provided with switches such as a dimmer switch and a winker switch. In addition, a master cylinder connected to a brake lever is omitted from the drawing. Besides, a clutch lever is omitted from the drawing. Note that an automatic clutch may be adopted.

Referring to FIGS. 2 and 6 together, the fork holder 15 is provided to be spaced to the front side from the first steering axis C1. Specifically, the fork holder 15 is hollow cylindrical in shape, and is provided to be slanted rearward relative to the vertical direction on the front side of the front blocks 3. The fork holder 15 supports the shaft part 16 of the fork 17 on the radially inside thereof such that the shaft part 16 can be rotated (steering can be performed) about the second steering axis C2. The upper end portion 16a of the shaft part 16 protrudes upward beyond an upper end portion 15a of the fork holder 15. Note that the shaft part 16 and the fork holder 15 have the second steering axis C2 as their center axes.

In the condition wherein the upper end portion 16a of the shaft part 16 protrudes upward beyond the upper end portion 15a of the fork holder 15, a bearing (not shown) for rotatably supporting the shaft part 16 is assembled between the shaft part 16 and the fork holder 15 from the side of the upper end portion 16a of the shaft part 16. Symbol 14 in the drawings denotes a slip-off preventing member, which is fitted onto the shaft part 16 from the side of the upper end portion 16a of the shaft part 16 to prevent detachment of the bearing.

At front upper portions of the fork holder 15, upper connection parts 15c to which front end portions 21a of the upper arm 21 are connected are formed to protrude forwardly upward. At rear lower portions of the fork holder 15, lower connection parts 15d to which front end portions 22a of the lower arm 22 are connected are formed to protrude rearwardly downward. The upper connection parts 15c are disposed on the front side of the second steering axis C2 in side view, and the lower connection parts 15d are disposed on the rear side of the second steering axis C2 in side view. At left and right side surfaces of the fork holder 15, there are formed ribs 15r for reinforcing the lower connection parts 15d. The rib 15r is in a V shape opening forwardly upward in side view, and bifurcately extends forwardly upward from the lower connection part 15d such that rib height is greater on the lower connection part 15d side.

Referring to FIGS. 2 and 6 together, the steering member 45 is supported by the upper end portion 16a of the shaft part 16, above the upper end portion 15a of the fork holder 15. The steering member 45 integrally has: link front connection parts 45a to which front end portions of the left and right link members 41 and 42 are connected; a shaft support part 45b having a C shape opening on the front side as viewed in the direction along the second steering axis C2; and link parts 45c each of which extends from the upper end of the shaft support part 45b to be located on the transversely more outer side on the more upper side and links the link front connection part 45a and the shaft support part 45b to each other. The link front connection parts 45a, the shaft support part 45b and the link parts 45c are, for example, component parts made of aluminum, and are formed integrally with one another.

In this embodiment, the link parts 45c extend from left and right upper ends of the shaft support part 45b so as to be located on transversely more outer sides on the more upper side, to reach the link front connection parts 45a.

A front end portion of the shaft support part 45b is formed therein with an insertion hole opening in the transverse direction. For example, in a condition wherein the shaft support part 35b is fitted to the upper end portion 16a of the shaft part 16, a bolt passed through the insertion hole is engaged with a nut and tightened, whereby the steering member 45 is fastened to the upper end portion 16a of the shaft part 16. The steering member 45 can be rotated (steering can be performed) about the second steering axis C2 together with the fork 17 attendant on an operation of the bar handle 18.

Referring to FIGS. 2 and 4 together, the left and right link members 41 and 42 have a rectilinear shape extending in the longitudinal vehicle direction in side view and in top plan view. The left and right link members 41 and 42 are provided on the left and right sides in the transverse direction. At front end portions of the left and right link members 41 and 42, there are provided front ball joints 41F and 42F, which are connected to the link front connection parts 45a. At rear end portions of the left and right link members 41 and 42, there are provided rear ball joints 41R and 42R which are connected to the link rear connection parts 38c.

The front and rear ball joints 41F, 41R, 42F and 42R each have a ball stud 43 and a socket 44. The ball stud 43 has a spherical ball part 43a, and a stud part 43b projecting to the upper side of the ball part 43a. The ball part 43a is slidably retained inside the socket 44. The stud part 43b extend rectilinearly in the vehicle vertical direction. The socket 44 has upper and lower sockets 44a and 44b. Between the upper and lower sockets 44a and 44b, the ball part 43a is retained slidably.

The link front connection parts 45a are formed therein with insertion holes opening in the vehicle vertical direction. Screw portions of upper end portions of the stud parts 43b of the front ball joints 41F and 42F are inserted in the insertion holes of the link front connection parts 45a, then nuts are engaged with upwardly projecting portions of the screw portions and the nuts are tightened, whereby the stud parts 43b of the front ball joints 41F and 42F are fastened to the link front connection parts 45a. The center axis of the stud part 43b of the front ball joint 41F, 42F will hereinafter be referred to as a "first axis C4." Front end portions of the left and right link members 41 and 42 are connected to the link front connection parts 45a through the front ball joints 41F and 42F so as to be rotatable about the first axis C4.

The link rear connection parts 38c are formed therein with insertion holes opening in the vehicle vertical direction. Screw portions of upper end portions of the stud parts 43b of the rear ball joints 41R and 42R are inserted in the insertion holes of the link rear connection parts 38c, then nuts are engaged with upwardly projecting portions of the screw portions and the nuts are tightened, whereby the stud parts 43b of the rear ball joints 41R and 42R are fastened to the link rear connection parts 38c. The center axis of the stud part 43b of the rear ball joint 41R, 42R will hereinafter be referred to as a "second axis C5." Rear end portions of the left and right link members 41 and 42 are connected to the link rear connection parts 38c through the rear ball joints 41R and 42R so as to be rotatable about the second axis C5.

In this embodiment, the right link member 42 has screw portions at front and rear end portions thereof, and is fixed by use of lock nuts in a condition wherein the front and rear screw portions are engaged respectively with a rear end portion of the lower socket 44b of the front ball joint 42F and a front end portion of the lower socket 44b of the rear ball joint 42R in a predetermined engagement amount. This ensures that by loosening the lock nuts and increasing or decreasing the engagement amounts between the lower sockets 44b and the screw portions, it is possible to adjust the distance between the front and rear connection parts of the right link member 42.

In this embodiment, the connection between the stud part 43b of the rear ball joint 41R of the left link member 41 and the link rear connection part 38c is performed in a rubber mount mode. Symbol 48 in FIG. 4 denotes a circular annular rubber member fitted to the stud part 43b of the rear ball joint 41R. For example, the screw portion of the upper end portion of the stud part 43b of the rear ball joint 41R is inserted in the insertion hole of the link rear connection part 38c, the rubber member 48 is fitted to the upwardly projecting portion of the screw portion, then a nut is engaged with the upwardly projecting portion above the rubber member 48 and the nut is tightened, whereby the stud part 43b of the rear ball joint 41R is rubber mounted to the link rear connection part 38c.

Referring to FIGS. 2 and 6 together, the support arm 20 has upper and lower arms 21 and 22 provided to extend in the longitudinal vehicle direction and to be oscillatable up and down. The upper and lower arms 21 and 22 are disposed side by side in the vehicle vertical direction and extend along the longitudinal vehicle direction. Front end portions 21a of the upper arm 21 are disposed on the transversely outer sides of an upper portion of the fork holder 15, whereas front end portions 22a of the lower arm 22 are disposed on the transversely inner sides of lower portions of the fork holder 15. Rear end portions 21b and 22b of the upper and lower arms 21 and 22 are disposed on the transversely inner sides of front portions of the front blocks 3. The rear end portions 21b and 22b of the upper and lower arms 21 and 22 are accommodated in the gate-shaped lower opening portion 3s of the front blocks 3.

The front and rear end portions 21a and 21b of the upper arm 21 are disposed on the front side of the front and rear end portions 22a and 22b of the lower arm 22 in side view. In side view, the front end portions 21a of the upper arm 21 are disposed on the front side of the second steering axis C2, whereas the front end portions 22a of the lower arm 22 are disposed on the rear side of the second steering axis C2. The rear end portions 21b and 22b of the upper and lower arms 21 and 22 are oscillatably supported by front portions of the front blocks 3. The fork holder 15 is oscillatably connected to the front end portions 21a and 22a of the upper and lower arms 21 and 22.

The upper and lower connection parts 15c and 15d of the fork holder 15 are oscillatably connected to the front end portions 21a and 22a of the upper and lower arms 21 and 22 through bolts 23a and 25a serving as link shafts along the transverse direction. The bolt 23a extends in the transverse direction, penetrating the upper connection parts 15c of the fork holder 15 and the front end portions 21a of the upper arm 21. The bolt 25a extends in the transverse direction, penetrating the lower connection parts 15d of the fork holder 15 and the front end portions 22a of the lower arm 22. Symbol C11 in the drawing denotes a center axis of the bolt 23a interlinking the upper connection parts 15c of the fork holder 15 and the front end portions 21a of the upper arm 21. Symbol C13 in the drawing denotes a center axis of the bolt 25a interlinking the lower connection parts 15d of the fork holder 15 and the front end portions 22a of the lower arm 22.

The rear end portions 21b and 22b of the upper and lower arms 21 and 22 are oscillatably connected to the upper and lower connection parts 3a and 3b of the front blocks 3 through bolts 24a and 26a serving as link shafts along the transverse direction. The bolt 24a extends in the transverse direction, penetrating the rear end portions 21b of the upper arm 21 and the upper connection parts 3a of the front blocks 3. The bolt 26a extends in the transverse direction, penetrating the rear end portions 22b of the lower arm 22 and the lower connection parts 3b of the left and right extension parts 30L and 30R. The rear end portions 21b and 22b of the upper and lower arms 21 and 22 are rotatably supported through the bolts 24a and 26a extending in the transverse direction while penetrating the front blocks 3, whereby the upper and lower arms 21 and 22 can be supported with high rigidity. Symbol C12 in the drawing denotes a center axis of the bolt 24a interlinking the rear end portions 21b of the upper arm 21 and the upper connection parts 3a of the front blocks 3. Symbol C14 in the drawing denotes a center axis of the bolt 26a interlinking the rear end portions 22b of the lower arm 22 and the lower connection parts 3b of the left and right extension parts 30L and 30R.

Hereinafter, the center axis of the bolt 23a will be referred to as the "first link axis C11," the center axis of the bolt 24a as the "second link axis C12," the center axis of the bolt 25a as the "third link axis C13," and the center axis of the bolt 26a as the "fourth link axis C14."

Referring to FIG. 2, in side view, a straight line passing through the first link axis C11 and the second link axis C12 is referred to as a "first straight line AX1," and a straight line passing through the third link axis C13 and the fourth link axis C14 is referred to as a "second straight line AX2." In side view, the first straight line AX1 of the upper arm 21 and the second straight line AX2 of the lower arm 22 are substantially parallel to each other.

In side view, the length in the longitudinal vehicle direction of the upper arm 21 and the length in the longitudinal vehicle direction of the lower arm 22 are substantially the same. In other words, in side view, the length of a line segment connecting the first link axis C11 and the second link axis C12 is substantially the same as the length of a line segment connecting the third link axis C13 and the fourth link axis C14. This ensures that the fork holder 15 is moved up and down substantially in parallel in response to up-down oscillation of the upper and lower arms 21 and 22. Note that the upper and lower arms 21 and 22 may be disposed in such a manner that the fork holder 15 is tilted in response to the up-down oscillation of the upper and lower arms 21 and 22.

The rear end portions 21b of the upper arm 21 (the second link axis C12) and the rear end portions 22b of the lower arm 22 (the fourth link axis C14) are disposed between the second steering axis C2 and a stroke axis C3 which will be described later, in side view.

Figure 5:
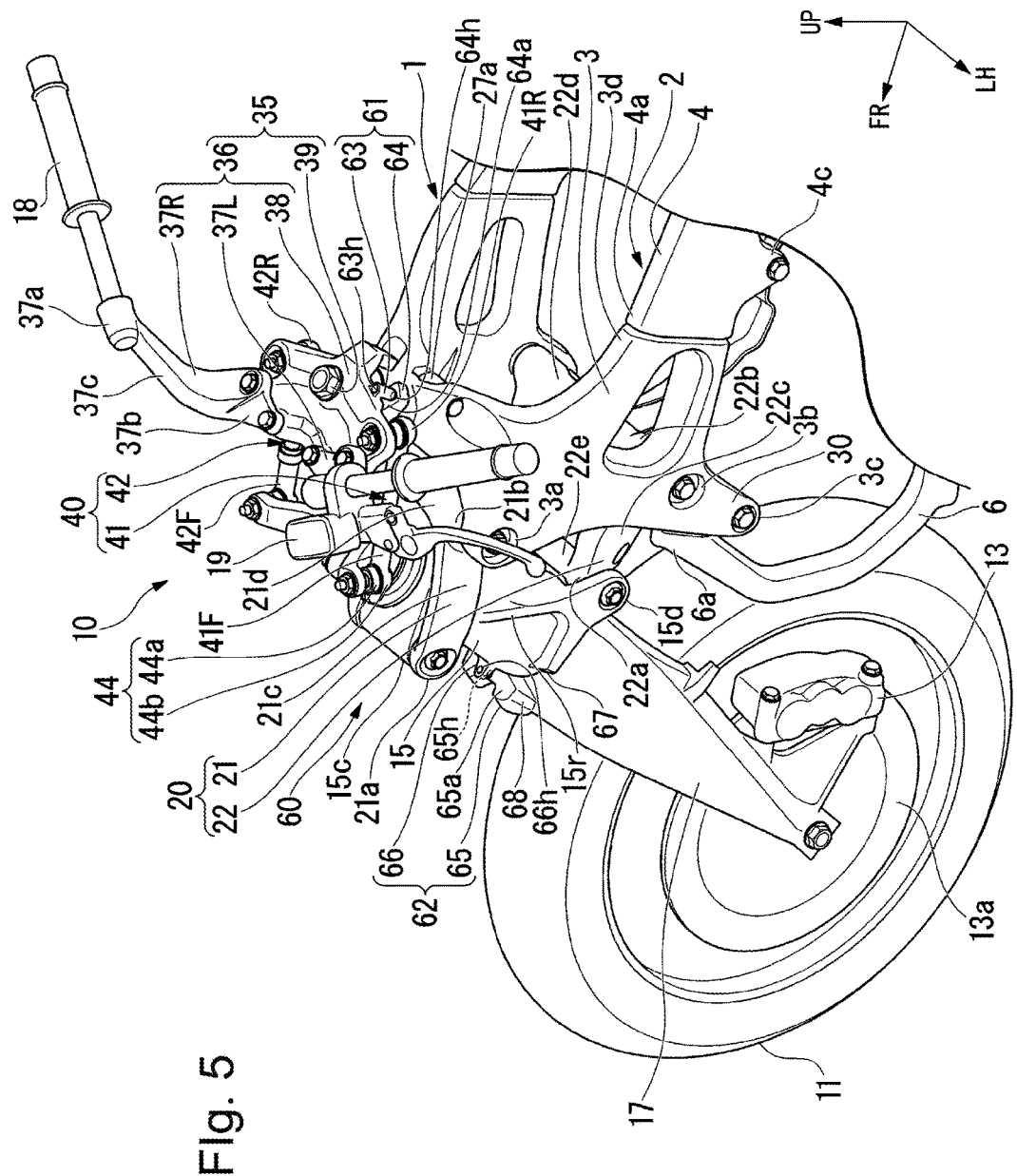
FIG. 5 is a perspective view of the front wheel suspension device as viewed from a left rear side.

Referring to FIGS. 5 and 6 together, the upper arm 21 integrally includes left and right arm main bodies 21c extending in the longitudinal vehicle direction, and a cross member 21d interlinking rear end portions 21b of the left and right arm main bodies 21c. The components of the upper arm 21 are, for example, component parts made of aluminum, and are formed integrally with one another.

The left and right arm main bodies 21c are disposed on both the left and right sides of an upper portion of the fork holder 15. The left and right arm main bodies 21c are curved to the transversely inside so as to be along an outer wall surface of the upper portion of the fork holder 15.

The cross member 21d extends in the transverse direction on the rear side of the upper portion of the fork holder 15. Both end portions of the cross member 21d are joined to the rear end portions 21b of the left and right arm main bodies 21c.

The front end portions 21a of the left and right arm main bodies 21c are formed therein with insertion holes opening in the transverse direction. In a condition wherein the upper connection part 15c of the fork holder 15 is interposed between the front end portions 21a of the left and right arm main bodies 21c, a bolt 23a is passed through the insertion holes (the insertion holes in the front end portions 21a of the left and right arm main bodies 21c) and the inner periphery of the upper connection part 15c, and is engaged with a nut (not shown) and tightened. The upper connection part 15c of the fork holder 15 is supported on the front end portions 21a of the upper arm 21 through collars and ball bearings (both not shown) so as to be rotatable about the first link axis C11.

The upper connection parts 3a of the left and right front blocks 3L and 3R are formed therein with insertion holes opening in the transverse direction. In a condition wherein the rear end portions 21b of the upper arm 21 (the rear end portions 21b of the left and right arm main bodies 21c and the cross member 21d) are interposed between the upper connection parts 3a of the left and right front blocks 3L and 3R, a bolt 24a is passed through the insertion holes (the insertion holes in the upper connection parts 3a of the left and right front blocks 3L and 3R) and the inner peripheries of the rear end portions 21b of the upper arm 21, and is engaged with a nut (not shown) and tightened. The rear end portions 21b of the upper arm 21 are supported on the upper connection parts 3a of the left and right front blocks 3L and 3R through collars and ball bearings (both not shown) in such a manner as to be rotatable about the second link axis C12.

Referring to FIGS. 5 and 6 together, the lower arm 22 integrally has left and right main bodies 22c extending in the longitudinal vehicle direction, a front cross member 22e interlinking the front end portions 22a of the left and right arm main bodies 22c, and a rear cross member 22d interlinking the rear end portions 22b of the left and right arm main bodies 22c. The components of the lower arm 22 are, for example, component parts made of aluminum, and are formed integrally with one another.

The left and right arm main bodies 22c are disposed on both the left and right sides of a lower portion of the cushion member 27.

The front cross member 22e extends in the transverse direction on the front side of a lower portion of the cushion member 27. Both end portions of the front cross member 22e are joined to the front end portions 22a of the left and right arm main bodies 22c.

The rear cross member 22d extends in the transverse direction on the rear side of the lower portion of the cushion member 27. Both end portions of the rear cross member 22d are joined to the rear end portions 22b of the left and right arm main bodies 22c.

The left and right lower connection parts 15d projecting rearward from rear left and right portions of the fork holder 15 are formed therein with insertion holes opening in the transverse direction. In a condition wherein the front end portions 22a of the left and right arm main bodies 22c (the front end portions 22a of the left and right arm main bodies 22c and the front cross member 22e) are interposed between the left and right lower connection parts 15d, a bolt 25a is passed through the insertion holes (the insertion holes in the left and right lower connection parts 15d) and the inner peripheries of the front end portions of the left and right arm main bodies 22c, and is engaged with a nut (not shown) and tightened. The left and right lower connection parts 15d of the fork holder 15 are supported on the front end portions 22a of the lower arm 22 through collars and ball bearings (both not shown) so as to be rotatable about the third link axis C13.

The lower connection parts 3b of the left and right extension parts 30L and 30R are formed therein with insertion holes opening in the transverse direction. In a condition where the rear end portions 22b of the lower arm 22 (the rear end portions 22b of the left and right arm main bodies 22c and the rear cross member 22d) are interposed between the lower connection parts 3b of the left and right extension parts 30L and 30R, a bolt 26a is passed through the insertion holes (the insertion holes in the lower connection parts 3b of the left and right extension parts 30L and 30R) and the inner peripheries of the rear end portions 22b of the lower arm 22, and is engaged with a nut (not shown) and tightened. The rear end portions 22b of the lower arm 22 are supported on the lower connection parts 3b of the left and right extension parts 30L and 30R through collars and ball bearings (both not shown) so as to be rotatable about the fourth link axis C14.

Referring also to FIG. 2, in the lower arm 22, on the rear side of a transversely central portion of the front cross member 22e and at the front end portions 22a of the left and right arm main bodies 22c, there are formed cushion lower connection parts 27d to which a lower end portion 27b of the cushion member 27 is connected.

Referring to FIGS. 2 and 6 together, the cushion member 27 has a rod type damper 27j so slanted as to be located on the more rear side on the more upper side in side view, and a coil spring 27k wound around the damper 27j. The cushion member 27 contracts and expands by stroking along a center axis C3 thereof, thereby providing a predetermined cushioning action. The center axis C3 will hereinafter be referred to as a "stroke axis." A cushion upper connection part 27c is disposed on the rear side of the first steering axis C1 such that the stroke axis C3 is slanted rearward relative to the vertical direction in side view.

The cushion member 27 has a lower end portion 27b stroking attendant on oscillation of the lower arm 22, thereby providing a cushioning action. The cushion member 27 is disposed on a front upper side of the engine and on a rear upper side of the front wheel 11 in side view. An upper portion of the cushion member 27 is accommodated in the gate-shaped lower opening portion 3s of the front blocks 3. An upper end portion 27a of the cushion member 27 is covered with the front blocks 3 in side view. The upper end portion 27a of the cushion member 27 is oscillatably connected to cushion upper connection parts 27c of the left and right extension parts 33L and 33R, and a lower end portion 27b of the cushion member 27 is oscillatably connected to the cushion lower connection parts 27d of the lower arm 22.

The upper end portion 27a of the cushion member 27 is oscillatably connected to the cushion upper connection parts 27c of the left and right extension parts 33L and 33R through a bolt 34a serving as a link shaft along the transverse direction. The bolt 34a extends in the transverse direction, penetrating the cushion upper connection parts 27c and the upper end portion 27a of the cushion member 27. Symbol C15 in the drawing denotes a center axis of the bolt 34a interlinking the cushion upper connection parts 27c and the upper end portion 27a of the cushion member 27.

The cushion upper connection parts 27c of the left and right extension parts 33L and 33R are formed therein with insertion holes opening in the transverse direction. In a condition wherein the upper end portion 27a of the cushion member 27 is interposed between the cushion upper connection parts 27c of the left and right extension parts 33L and 33R, the bolt 34a is passed through the insertion holes (the insertion holes in the cushion upper connection parts 27c of the left and right extension parts 33L and 33R) and the inner periphery of the upper end portion 27a of the cushion member 27, and a nut (not shown) is engaged with a projecting portion of the bolt 34a and tightened. The upper end portion 27a of the cushion member 27 is supported on the cushion upper connection parts 27c of the left and right extension parts 33L and 33R through collars (not shown) so as to be rotatable about the center axis C15.

The lower end portion 27b of the cushion member 27 is oscillatably connected to the left and right cushion lower connection parts 27d of the lower arm 22 through a bolt 28a serving as a link shaft along the transverse direction. The bolt 28a extends in the transverse direction, penetrating the cushion lower connection parts 27d and the lower end portion 27b of the cushion member 27. Symbol C16 in the drawing denotes a center axis of the bolt 28a interlinking the cushion lower connection parts 27d and the lower end portion 27b of the cushion member 27.

The left and right cushion lower connection parts 27d of the lower arm 22 are formed therein with insertion holes opening in the transverse direction. In a condition wherein the lower end portion 27b of the cushion member is interposed between the left and right cushion lower connection parts 27d of the lower arm 22, the bolt 28a is passed through the insertion holes (the insertion holes in the left and right cushion lower connection parts 27d of the lower arm 22) and the inner periphery of the lower end portion 27b of the cushion member 27, and a nut (not shown) is engaged with a projecting portion of the bolt 28a and tightened. The lower end portion 27b of the cushion member 27 is supported on the left and right cushion lower connection parts 27d of the lower arm 22 through collars (not shown) in so as to be rotatable about the center axis C16.

An operation of the cushion member 27 will be described below.

When the front wheel 11 is relatively displaced upward due to front wheel braking or the like starting from a 1G condition wherein a load corresponding to the vehicle weight is exerted on the front wheel suspension device 10, the support arm 20 is oscillated upward, and the fork 17 and the fork holder 15 are displaced upward. In this instance, the lower arm 22 is rotated rearward clockwise in FIG. 2 about the fourth link axis C14. Then, the lower arm 22 displaces the lower end portion 27b of the cushion member 27 upward, thereby compressing the cushion member 27.

When the fork holder 15 is displaced upward, the steering member 45 is also displaced integrally in response to this. In this instance, the left and right link members 41 and 42 are displaced in relation to the handle post 35, and the angle of the second steering axis C2 relative to the first steering axis C1 is changed, which change is absorbed by oscillation of the front and rear ball joints 41F, 41R, 42F and 42R and oscillation of the left and right link members 41 and 42.

On the other hand, when the front wheel 11 is relatively displaced downward due to acceleration or the like starting from the 1G condition, the support arm 20 is oscillated downward, and the fork 17 and the fork holder 15 are displaced downward. In this instance, the lower arm 22 is rotated forward counterclockwise in FIG. 2 about the fourth link axis C14. Then, the lower arm 22 displaces the lower end portion 27b of the cushion member 27 downward, thereby expanding the cushion member 27.

When the fork holder 15 is displaced downward, the steering member 45 is also displaced integrally in response to this. In this instance, the left and right link members 41 and 42 are displaced in relation to the handle post 35, and the angle of the second steering axis C2 relative to the first steering axis C1 is changed, which change is absorbed by oscillation of the front and rear ball joints 41F, 41R, 42F and 42R and oscillation of the left and right link members 41 and 42.

An example of laying of a brake hose 70 will be described below.

Figure 7:
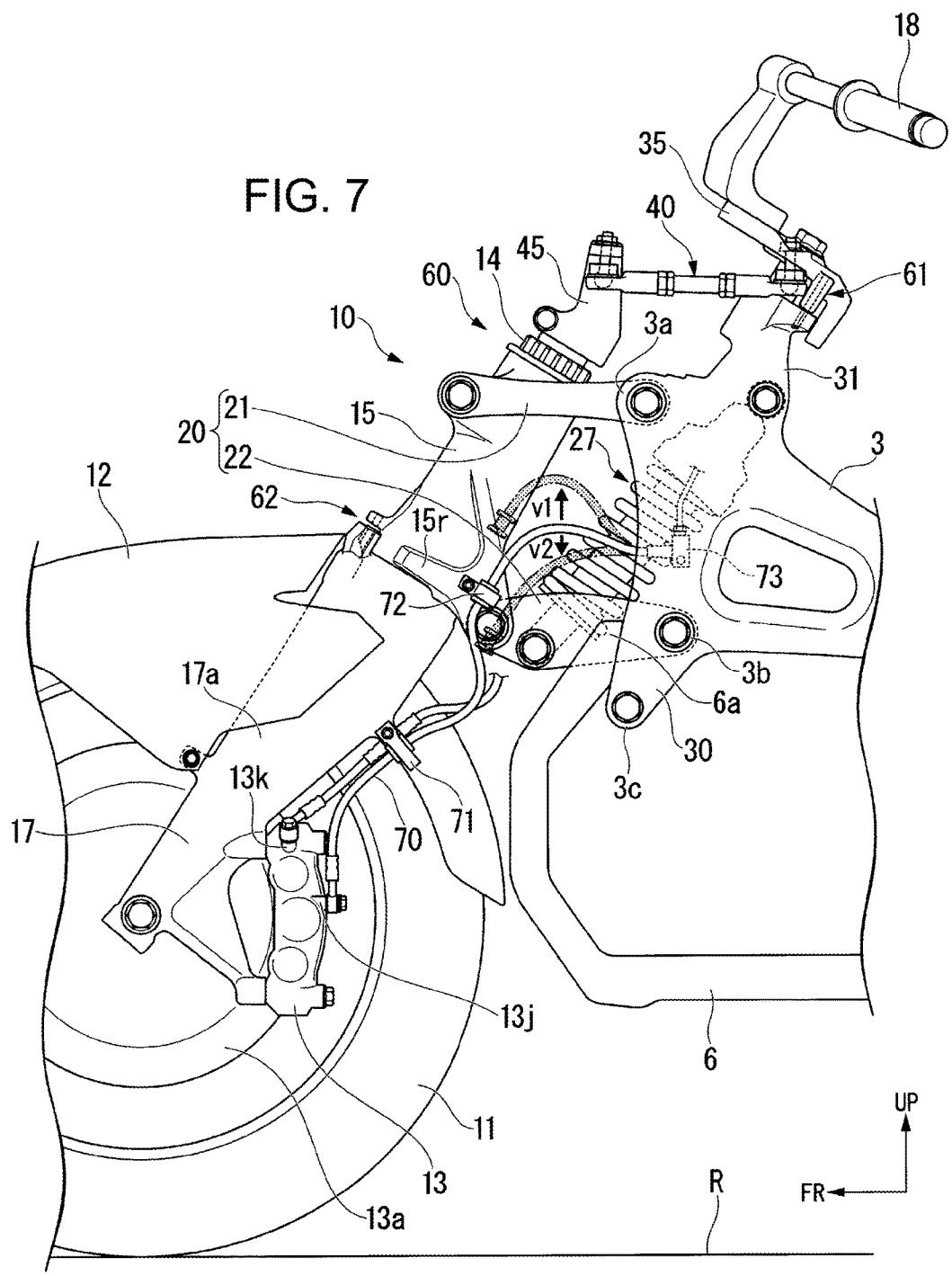
FIG. 7 is a left side view showing an example of laying of a brake hose in the motorcycle.

Referring to FIG. 7, the brake hose 70 is connected between the brake caliper 13 and a master cylinder (not shown). Symbols 13j and 13k in FIG. 7 denote connection parts of the brake caliper 13 for the brake hose 70. An example of laying of the brake hose 70 connected to the connection part 13j, of the connection parts 13j and 13k of the brake caliper 13, will be described.

The brake hose 70 is attached to a plurality (for example, in this embodiment, three) of clamps 71, 72 and 73 (a first clamp 71, a second clamp 72 and a third clamp 73) in its course from the connection part 13j of the brake caliper 13 to the master cylinder (not shown).

The first clamp 71 is provided at a rear end portion of a vertically intermediate portion of the left arm part 17a of the fork 17. The second clamp 72 is provided at a branched portion of the rib 15r of the fork holder 15. The third clamp 73 is provided on the side (transversely inside) for fronting on the gate-shaped lower opening portion 3s (see FIG. 3) of the front blocks 3 and between the upper and lower connection parts 3a and 3b. Note that the position where the third clamp 73 is disposed is such a position as not to touch the oscillation loci (not shown) of the upper and lower arms 21 and 22 in side view.

The brake hose 70 is laid so as to have slack between the connection part 13j of the brake caliper 13 and the first clamp 71, between the first clamp 71 and the second clamp 72, between the second clamp 72 and the third clamp 73, and between the third clamp 73 and the master cylinder (not shown).

In side view in FIG. 7, the brake hose 70 is laid so as to slacken on the lower side of the lower arm 22 between the first clamp 71 and the second clamp 72, and is laid so as to slacken between the upper and lower arms 21 and 22 between the second clamp 72 and the third clamp 73.

For instance, when the front wheel 11 is steered, or the fork 17 is rotated about the second steering axis C2 (see FIG.

1), that portion of the brake hose 70 that is located between the first clamp 71 and the second clamp 72 is displaced about the second steering axis C2.

For example, when the front wheel 11 is relatively displaced upward (when the support arm 20 is oscillated upward and the fork holder 15 is displaced upward) in side view in FIG. 7, the second clamp 72 is displaced upward, and that portion of the brake hose 70 that is located between the second clamp 72 and the third clamp 73 is displaced upward (arrow v1 in FIG. 7).

On the other hand, when the front wheel 11 is relatively displaced downward (when the support arm 20 is oscillated downward and the fork holder 15 is displaced downward), the second clamp 72 is displaced downward, and that portion of the brake hose 70 that is located between the second clamp 72 and the third clamp 73 is displaced downward (arrow v2 in FIG. 7).

In this way, the brake hose 70 is laid so as to have slack between the connection part 13*j* of the brake caliper 13 and the first clamp 71, between the first clamp 71 and the second clamp 72, and between the third clamp 73 and the master cylinder (not shown). As a result, as compared with the case where the brake hose 70 is laid so as to have slack between the connection part 13*j* of the brake caliper 13 and the master cylinder without being intermediated by clamps, the laying of the brake hose 70 between the connection part 13*j* of the brake caliper 13 and the master cylinder can be made in an orderly manner. In addition, even in the case where the front wheel 11 is steered, the brake hose 70 can be displaced between the first clamp 71 and the second clamp 72. Besides, even in the case where the front wheel 11 is displaced up or down, the brake hose 70 can be displaced between the second clamp 72 and the third clamp 73.

Referring to FIGS. 1 and 2 together, a positioning structure for the front wheel suspension device 10 includes a first engagement part 61 for engaging the handle post 35 with the handle support part 31 at a first steering angle, at the time of assembling the vehicle, a second engagement part 62 for engaging the fork 17 and the fork holder 15 at a second steering angle, and a linking mechanism 60 for linking the first engagement part 61 with the second engagement part 62. The linking mechanism 60 is provided with a steering adjusting mechanism 40 for putting the first engagement part 61 into engagement by adjusting the first steering angle and for putting the second engagement part 62 into engagement by adjusting the second steering angle.

Here, the first steering angle is an angle about the first steering axis C1, and the second steering angle is an angle about the second steering axis C2.

Specifically, as viewed from the direction along the first steering axis C1, let a line orthogonal to the first steering axis C1 be a first imaginary line and let a line overlapping with the center line CL across the transverse direction be a first reference line, then the first steering angle is the angle formed between the first reference line and the first imaginary line, with the first steering axis C1 as a center.

In addition, as viewed from the direction along the second steering axis C2, let a line orthogonal to the second steering axis C2 be a second imaginary line and let a line overlapping with the center line CL across the transverse direction be a second reference line, then the second steering angle is the angle formed between the second reference line and the second imaginary line, with the second steering axis C2 as a center.

In this embodiment, the first steering angle and the second steering angle are 0°.

Referring to FIGS. 2 and 4 together, the first engagement part 61 includes a handle post side engaging part 63 (steering part side engaging part) formed in the handle post 35, and a handle support part side engaging part 64 formed in the handle support part 31 (body frame side engaging part).

The handle post side engaging part 63 is formed so as to have a thickness in the direction along the first steering axis C1 in side view in FIG. 2, and to project rearward from a left rear end portion of the base part 38 in FIG. 4.

The handle support part side engaging part 64 is formed so as to have a thickness in the direction along the first steering axis C1 in side view in FIG. 2, and to project rearward from a left rear end portion of the handle support part 31 in FIG. 4. The thickness of the handle support part side engaging part 64 is gradually decreased in going away from the left rear end portion of the handle support part 31.

The handle post side engaging part 63 is formed therein with a handle post side insertion part 63*h* (steering part side insertion part) in and through which a first insertion member (not shown) can be inserted and passed. The handle post side insertion part 63*h* is a through-hole penetrating the handle post side engaging part 63 in the thickness direction of the latter.

The handle support part side engaging part 64 is formed therein with a handle support part side insertion part 64*h* (body frame side insertion part) in and through which the first insertion member can be inserted and passed. The handle support part side insertion part 64*h* is a through-hole penetrating the handle support part side engaging part 64 in the thickness direction of the latter.

Since the handle post side insertion part 63*h* and the handle support part side insertion part 64*h* are through-holes, the handle post side insertion part 63*h* and the handle support part side insertion part 64*h* function as drain holes, and, accordingly, accumulation of water or the like in the handle post side insertion part 63*h* and the handle support part side insertion part 64*h* can be restrained.

At the first steering angle (0° as above mentioned), the handle post side insertion part 63*h* and the handle support part side insertion part 64*h* communicate with each other in the direction along the first steering axis C1, which is slanted rearward in relation to the vertical direction. Note that at the first steering angle (0° as above mentioned), the handle post side insertion part 63*h* and the handle support part side insertion part 64*h* are not limited to communicate with each other in the direction along the first steering axis C1, but it is sufficient that they communicate with each other in the vertical direction.

For instance, the first insertion member has a shaft part that extends rectilinearly in one direction and that can be inserted into and passed through both the handle post side insertion part 63*h* and the handle support part side insertion part 64*h*, and a head part, which is provided at one end of the shaft part and which cannot be inserted into or passed through the handle post side insertion part 63*h* (specifically, the head part is greater in diameter than the handle post side insertion part 63*h*). For example, at the first steering angle (0° as above mentioned), in a condition wherein the handle post side insertion part 63*h* and the handle support part side insertion part 64*h* communicate with each other, the shaft part of the first insertion member is inserted into and passed through the handle post side insertion part 63*h* and the handle support part side insertion part 64*h* from the upper side of the handle post side insertion part 63*h*, whereby the head part of the first insertion member is seated on the handle post side engaging part 63 in a condition wherein the shaft part of the first insertion part is inserted in and passed through the handle post side insertion part 63h and the handle support part side insertion part 64h. Consequently, the handle post side engaging part 63 and the handle support part side engaging part 64 can be positioned.

Referring to FIG. 4, the handle support part side engaging part 64 is formed with a handle support part side sliding part 64a (body frame side sliding part), which allows sliding of a lower end of the shaft part of the first insertion member until the first insertion member is inserted in and passed through the handle support part side insertion part 64h. The handle support part side sliding part 64a is a flat surface located in a plane orthogonal to the first steering axis C1. The handle support part side sliding part 64a is disposed so as to front on a lower end of the handle post side engaging part 63.

Referring to FIGS. 2 and 3 together, the second engagement part 62 includes a fork side engaging part 65 (fork side engaging part) formed in the fork 17, and a fork holder side engaging part 66 formed in the fork holder 15.

The fork side engaging part 65 is formed so as to have a thickness in the direction along the second steering axis C2 in side view in FIG. 2, to extend in the transverse direction and to project upward from a front upper end portion of the cross member 17b of the fork 17 in FIG. 3. At a transversely central portion of the fork side engaging part 65, there is formed a recess, which is recessed rearward.

The fork holder side engaging part 66 is formed so as to have a thickness in the direction along the second steering axis C2 in side view in FIG. 2, and to project forward from a front lower end portion of the fork holder 15 in FIG. 3.

The fork side engaging part 65 is formed with a fork side insertion part 65h (fork side insertion part) in and through which a second insertion member (not shown) can be inserted and passed. The fork side insertion part 65h is a through-hole penetrating the fork side engaging part 65 in the thickness direction of the latter.

The fork holder side engaging part 66 is formed with a fork holder side insertion part 66h in and through which the second insertion member can be inserted and passed. The fork holder side insertion part 66h is a through-hole penetrating the fork holder side engaging part 66 in the thickness direction of the latter.

Since the fork side insertion part 65h and the fork holder side insertion part 66h are through-holes, the fork side insertion part 65h and the fork holder side insertion part 66h function as drain holes, and, accordingly, accumulation of water or the like in the fork side insertion part 65h and the fork holder side insertion part 66h can be restrained.

At the second steering angle (0° as above mentioned), the fork side insertion part 65h and the fork holder side insertion part 66h communicate with each other in the direction along the second steering axis C2, which is slanted rearward relative to the vertical direction. Note that at the second steering angle (0° as above mentioned), the fork side insertion part 65h and the fork holder side insertion part 66h are not limited to communicate with each other in the direction along the second steering axis C2, and it is sufficient that they communicate with each other in the vertical direction.

For instance, the second insertion member has a shaft part that extends rectilinearly in one direction and that can be inserted into and passed through both the fork side insertion part 65h and the fork holder side insertion part 66h, and a head part, which is provided at one end of the shaft part and which cannot be inserted into or passed through the fork holder side insertion part 66h (specifically, the head part is greater in diameter than the fork holder side insertion part 66h). For example, at the second steering angle (0° as above mentioned), in a condition wherein the fork side insertion part 65h and the fork holder side insertion part 66h communicate with each other, the shaft part of the second insertion member is inserted into and passed through the fork holder side insertion part 66h and the fork side insertion part 65h from the upper side of the fork holder side insertion part 66h, whereby the head part of the second insertion member is seated on the fork holder side engaging part 66 in a condition wherein the shaft part of the second insertion part is inserted in and passed through the fork holder side insertion part 66h and the fork side insertion part 65h. Consequently, the fork side engaging part 65 and the fork holder side engaging part 66 can be positioned.

Referring to FIG. 5, the fork side engaging part 65 is formed with a fork side sliding part 65a (fork side sliding part), which allows sliding of a lower end of the shaft part of the second insertion member until the second insertion member is inserted in and passed through the fork side insertion part 65h. The fork side sliding part 65a is a flat surface located in a plane orthogonal to the second steering axis C2. The fork side sliding part 65a is disposed so as to front on a lower end of the fork holder side engaging part 66. The fork side insertion part 65h is disposed at the center in the transverse direction of the fork side sliding part 65a extending in the transverse direction.

Referring to FIGS. 5 and 6 together, at front end portions of the ribs 15r of the fork holder 15, fork holder side steering limiting parts 67 for limiting the steering angle of the fork 17 are formed. The fork holder side steering limiting parts 67 are flat surfaces located in planes parallel to the second steering axis C2. The fork holder side steering limiting parts 67 are provided in the ribs 15r on both sides in the transverse direction of the fork holder 15. The fork holder side steering limiting parts 67 are slanted so as to be located on the more rear side on the transversely more outer sides.

On the other hand, the fork side engaging part 65 is formed with fork side steering limiting parts 68 (fork side steering limiting parts), which can contact the fork holder side steering limiting parts 67. The fork side steering limiting parts 68 are flat surfaces located in planes parallel to the second steering axis C2. The fork side steering limiting parts 68 are disposed at both end portions in the transverse direction of the fork side engaging part 65 extending in the transverse direction. At the second steering angle (0° as above mentioned), the fork side steering limiting parts 68 are slanted so as to be located on the more front side on the transversely more outer sides.

Referring to FIGS. 2 and 4 together, the steering adjusting mechanism 40 includes: a right link member 42 that extends along the longitudinal vehicle direction on the right side (one side) in the transverse direction and that interlinks the handle post 35 and the fork holder 15; and a left link member 41, which extends along the longitudinal vehicle direction on the left side (the other side) in the transverse direction (in parallel to the longitudinal direction of the right link member 42) and which interlinks the handle post 35 and the fork holder 15.

As aforementioned, the right link member 42 has screw portions at its front and rear end portions, and is fixed by use of lock nuts in a condition where the front and rear screw portions are engaged, in predetermined engaging amounts, with a rear end portion of the lower socket 44b of the front ball joint 42F and a front end portion of the lower socket 44b of the rear ball joint 42R. This ensures that by slackening the lock nuts and increasing or decreasing the engaging amounts between the lower sockets 44b and the screw portions, it is possible to adjust the distance between the front and rear connection parts of the right link member 42. At the time of assembling the vehicle, by adjusting the distance between the front and rear connection parts of the right link member 42, it is possible to adjust at least one of the first steering angle and the second steering angle. In this way, the right link member 42 can be contracted and expanded such that at least one of the first steering angle and the second steering angle can be adjusted.

As above-described, the connection between the stud part 43b of the rear ball joint 41R of the left link member 41 and the link rear connection part 38c are made in a rubber mount mode. Here, the rear ball joint 41R corresponds to the "steering side link part" described in the claims.

An example of assemblage of the vehicle by use of the steering adjusting mechanism will be described below.

Referring to FIGS. 5 and 6 together, first, the front wheel suspension device 10 is mounted to the front blocks 3. Specifically, a steering system such as the bar handle 18, the handle post 35, the left and right link members 41 and 42 and the steering member 45 is mounted to the front blocks 3. Next, a front link system such as the fork holder 15, the upper and lower arms 21 and 22 and the cushion member 27 is mounted to the front blocks 3. Subsequently, the fork 17 is inserted into the fork holder 15 from below, and the upper end portion of the fork 17 is mounted to the steering member 45. Next, steering angle adjustment is conducted such that the steering angles on the handle side and the front wheel side coincide with each other. Specifically, the distance between the front and rear connection parts of the right link member 42 is adjusted, thereby to adjust at least one of the first steering angle and the second steering angle.

For instance, at the first steering angle (0° as above mentioned), in a condition wherein the handle post side insertion part 63h and the handle support part side insertion part 64h communicate with each other, the shaft part of the first insertion member is inserted into and passed through the handle post side insertion part 63h and the handle support part side insertion part 64h from above the handle post side insertion part 63h. In the condition wherein the shaft part of the first insertion member is inserted in and passed through the handle post side insertion part 63h and the handle support part side insertion part 64h, the distance between the front and rear connection parts of the right link member 42 is adjusted. By this, the handle post side engaging part 63 and the handle support part side engaging part 64 can be positioned.

On the other hand, at the second steering angle (0° as above mentioned), in a condition wherein the fork side insertion part 65h and the fork holder side insertion part 66h communicate with each other, the shaft part of the second insertion member is inserted into and passed through the fork holder side insertion part 66h and the fork side insertion part 65h from above the fork holder side insertion part 66h. In the condition wherein the shaft part of the second insertion member is inserted in and passed through the fork holder side insertion part 66h and the fork side insertion part 65h, the distance between the front and rear connection parts of the right link member 42 is adjusted. By this, the fork side engaging part 65 and the fork holder side engaging part 66 can be positioned.

Then, after the positioning of the handle post side engaging part 63 and the handle support part side engaging part 64 and the positioning of the fork side engaging part 65 and the fork holder side engaging part 66 are conducted, the left and right link members 41 and 42 are fastened. Finally, the first insertion member and the second insertion member are drawn out of the aforementioned respective insertion parts, whereby assemblage of the vehicle is completed.

As has been described above, the above embodiment is the positioning structure for the front wheel suspension device 10 including the fork 17 that supports the axle of the front wheel 11, the fork holder 15 that supports the fork 17 so as to enable steering and is supported by the front blocks 3 of the body frame 1, and the handle post 35 supported by the front blocks 3 in a steerable manner. The fork 17 can be rotated for steering about the second steering axis C2 offset to the front side of the first steering axis C1, which is the rotational axis of the handle post 35. The positioning structure includes the first engagement part 61 for engaging the handle post 35 and the front blocks 3 at the first steering angle that is the angle about the first steering axis C1 at the time of assembling the vehicle, the second engagement part 62 for engaging the fork 17 and the fork holder 15 at the second steering angle that is the angle about the second steering axis C2, and the linking mechanism 60 for linking the first engagement part 61 and the second engagement part 62 to each other. The linking mechanism 60 is provided with the steering adjusting mechanism 40 for putting the first engagement part 61 into engagement by adjusting the first steering angle and for putting the second engagement part 62 into engagement by adjusting the second steering angle.

According to this configuration, since the linking mechanism 60 has the steering adjusting mechanism 40 for putting the first engagement part 61 into engagement by adjusting the first steering angle and for putting the second engagement part 62 into engagement by adjusting the second steering angle, the steering angles can be adjusted such that the steering angles relevant to the first engagement part 61 and the second engagement part 62 coincide with each other by use of the steering adjusting mechanism 40 at the time of assembling the vehicle. Therefore, an adjustment by use of an angle gauge or the like is unnecessary, and the number of operating steps can be reduced. Consequently, the steering angle on the handle post 35 side and the steering angle on the front wheel 11 side can be adjusted by a simple configuration at the time of assembling the vehicle.

In addition, in the above embodiment, the handle post side engaging part 63 is formed with the handle post side insertion part 63h in and through which the first insertion member can be inserted and passed, and the handle support part side engaging part 64 is formed with the handle support part side insertion part 64h in and through which the first insertion member can be inserted and passed. This enables the steering angle adjustment to be achieved by only inserting and passing the first insertion member into and through the handle post side insertion part 63h and the handle support part side insertion part 64h. Therefore, workability at the time of assembling the vehicle can be enhanced. In addition, even in the case where the handle post 35 is formed with the handle post side engaging part 63, the handle post side engaging part 63 can be reduced in size and weight.

Besides, in the above embodiment, at the first steering angle, the handle post side insertion part 63h and the handle support part side insertion part 64h communicate with each other in the vertical direction. This causes the first insertion member to be inserted into and passed through the handle post side insertion part 63h and the handle support part side insertion part 64h under its own weight when the handle post side insertion part 63h and the handle support part side insertion part 64h overlap with each other in the vertical direction at the time of steering angle adjustment. Therefore, the workability in assembling the vehicle can be further enhanced. Besides, since the first insertion member is inserted into and passed through the handle post side insertion part 63*h* and the handle support part side insertion part 64*h* by its own weight, the assembling work can be performed efficiently even in the case where the handle post side insertion part 63*h* and the handle support part side insertion part 64*h* cannot be visually observed because the vehicle body is located at a high position, such as on a manufacturing base.

In addition, in the above embodiment, the handle support part side engaging part 64 is formed with the handle support part side sliding part 64*a* that allows sliding of the first insertion member until the first insertion member is inserted in and passed through the handle support part side insertion part 64*h*. This configuration ensures that even in the case where a misalignment is generated between the handle post side insertion part 63*h* and the handle support part side insertion part 64*h* at the time of steering angle adjustment, the first insertion member can slide until the misalignment is eliminated. Accordingly, the workability in assembling the vehicle can be enhanced further.

Besides, in the above embodiment, the fork side engaging part 65 is formed with the fork side insertion part 65*h* in and through which the second insertion member can be inserted and passed, and the fork holder side engaging part 66 is formed with the fork holder side insertion part 66*h* in and through which the second insertion member can be inserted and passed. This enables the steering angle adjustment to be achieved by only inserting and passing the second insertion member into and through the fork side engaging part 65 and the fork holder side engaging part 66. Consequently, the workability in assembling the vehicle can be enhanced.

In addition, in the above embodiment, at the second steering angle, the fork side insertion part 65*h* and the fork holder side insertion part 66*h* communicate with each other in the vertical direction. This causes the second insertion member to be inserted into and passed through the fork side insertion part 65*h* and the fork holder side insertion part 66*h* under its own weight when the fork side insertion part 65*h* and the fork holder side insertion part 66*h* overlap with each other in the vertical direction at the time of steering angle adjustment. Therefore, workability in assembling the vehicle can be further enhanced. Besides, since the second insertion member is inserted into and passed through the fork side insertion part 65*h* and the fork holder side insertion part 66*h* by its own weight, the assembling operation can be performed efficiently even in the case where the fork side insertion part 65*h* and the fork holder side insertion part 66*h* cannot be visually observed because the vehicle body is located at a high position such as on a manufacturing base.

In addition, in the above embodiment, the fork side engaging part 65 is formed with the fork side sliding parts 65*a* that allow sliding of the second insertion member until the second insertion member is inserted into and passed through the fork side insertion part 65*h*. This ensures that even in the case where a misalignment is generated between the fork side insertion part 65*h* and the fork holder side insertion part 66*h* at the time of steering angle adjustment, the second insertion member can slide until the misalignment is eliminated. Accordingly, the workability in assembling the vehicle can be further enhanced.

Besides, in the above embodiment, the fork side insertion part 65*h* is disposed at the center in the transverse direction of the fork side sliding parts 65*a* extending in the transverse direction. This ensures that even in the case where the fork side insertion part 65*h* is deviated to one side in the transverse direction in relation to the fork holder side insertion part 66*h* at the time of steering angle adjustment, the second insertion member can slide in the transverse direction until the deviation is eliminated. Consequently, the workability in assembling the vehicle can be enhanced further.

In addition, in the above embodiment, the fork holder 15 is formed with the fork holder side steering limiting part 67 for limiting the steering angle of the fork 17, and the fork side engaging part 65 is formed with the fork side steering limiting parts 68 that can contact the fork holder side steering limiting part 67. This enables the fork side engaging part 65 to have a function as a so-called handle stopper for limiting the steering angle of the fork 17. Therefore, it is unnecessary to separately provide a handle stopper. Consequently, a simplified device structure can be realized.

Besides, in the above embodiment, the fork side steering limiting parts 68 are disposed at both end portions in the transverse direction of the fork side engaging part 65 extending in the transverse direction. As a result, even in the case where the fork side steering limiting parts 68 receive a load when contacting the fork holder side steering limiting parts 67, the load can be received by both end portions in the transverse direction of the fork side engaging part 65. Therefore, strength as a handle stopper can be secured.

In addition, in the above embodiment, the right link member 42 can be contracted and expanded such that at least one of the first steering angle and the second steering angle can be adjusted. This enables steering adjustment (for example, absorption of a misalignment due to assemblage or the like) to be achieved by only contracting or expanding the right link member 42 at the time of steering angle adjustment. Therefore, a simple adjusting mechanism can be realized, and the workability in assembling the vehicle can be further enhanced.

Besides, in the above embodiment, at the left link member 41, the connection between the rear ball joint 41R and the link rear connection part 38*c* of the handle post 35 is performed in a rubber mount mode. This makes it possible, at the time of steering angle adjustment, to support the right link member 42 by the left link member 41 (for example, to absorb a misalignment due to assemblage or the like by flexure of the rubber) while performing steering adjustment by the right link member 42. Accordingly, the steering adjustment can be carried out effectively, and the workability in assembling the vehicle can be enhanced further.

Note that while an example in which the second steering axis C2 is spaced to the front side of the first steering axis C1 in side view has been described in the above embodiment, this configuration is not restrictive. For instance, the second steering axis C2 may be spaced to the rear side of the first steering axis C1 in side view. In other words, it is sufficient that the second steering axis C2 and the first steering axis C1 are offset from each other in the front-rear direction in side view. In addition, the second steering axis C2 and the first steering axis C1 may coincide with each other in side view.

Besides, while an example in which the second steering axis C2 and the first steering axis C1 are parallel to each other has been described in the above embodiment, this configuration is not limitative. For example, the second steering axis C2 and the first steering axis C1 may intersect each other.

In addition, while an example in which the first straight line AX1 of the upper arm 21 and the second straight line AX2 of the lower arm 22 are substantially parallel to each other has been described in the above embodiment, this configuration is not restrictive.

For instance, the first straight line AX1 of the upper arm 21 and the second straight line AX2 of the lower arm 22 may intersect each other at their rearward extension portions such that they are separated more from each other on the more front side. In order to obtain such an intersecting disposition, for example, the vertical position of the second link axis C12 may be shifted upward or the vertical position of the fourth link axis C14 may be shifted downward, in side view.

Besides, the first straight line AX1 of the upper arm 21 and the second straight line AX2 of the lower arm 22 may intersect each other at their forward extension portions such that they are separated more from each other on the more rear side. In order to realize such an intersecting disposition, for example, the vertical position of the second link axis C12 may be shifted upward or the vertical position of the fourth link axis C14 may be shifted downward, in side view.

In addition, while an example in which the first axis C4 is a straight line extending in the vertical direction, while the second axis C5 is a straight line being substantially parallel to the first axis C4 and extending in the vertical direction has been described in the above embodiment, this configuration is not limitative. For instance, a configuration may be adopted wherein the first axis C4 is a straight line along a direction intersecting the transverse direction and the second axis C5 is a straight line extending along a direction that intersects the transverse direction and is different from the direction of the first axis C4.

Besides, while an example wherein the first engagement part 61 has the handle post side engaging part 63 formed in the handle post 35 and the handle support part side engaging part 64 formed in the handle support part 31 has been described in the above embodiment, this configuration is not restrictive. For example, the first engagement part 61 may be composed of a separate member fixed to the body frame.

In addition, while an example wherein the handle post side insertion part 63h and the handle support part side insertion part 64h are through-holes has been described in the above embodiment, this configuration is not limitative. For example, a configuration may be adopted wherein either one of the handle post side insertion part 63h and the handle support part side insertion part 64h is a through-hole and the other is a recess so recessed as to communicate with the through-hole on the one side. It is to be noted, however, that both of the handle post side insertion part 63h and the handle support part side insertion part 64h are preferably through-holes, in order that both of the handle post side insertion part 63h and the handle support part side insertion part 64h function as drain holes.

Besides, while an example wherein the fork side insertion part 65h and the fork holder side insertion part 66h are through-holes has been described in the above embodiment, this configuration is not restrictive. For example, a configuration may be adopted wherein either one of the fork side insertion part 65h and the fork holder side insertion part 66h is a through-hole and the other is a recess so recessed as to communicate with the through-hole on the one side. It is to be noted, however, that both of the fork side insertion part 65h and the fork holder side insertion part 66h are preferably through-holes, in order that both of the fork side insertion part 65h and the fork holder side insertion part 66h function as drain holes.

In addition, while an example wherein the handle post side insertion part 63h and the handle support part side insertion part 64h communicate with each other in the vertical direction has been described in the above embodiment, this configuration is not restrictive. For instance, the handle post side insertion part 63h and the handle support part side insertion part 64h may communicate with each other in a radial direction of the hollow cylindrical boss part 32 of the handle support part 31 (in a direction orthogonal to the first steering axis C1). It should be noted, however, that it is preferable for the handle post side insertion part 63h and the handle support part side insertion part 64h to communicate with each other in the vertical direction, from the viewpoint of allowing the first insertion member to be inserted into and passed through the handle post side insertion part 63h and the handle support part side insertion part 64h by its own weight.

Besides, while an example in which the fork side insertion part 65h and the fork holder side insertion part 66h communicate with each other has been described in the above embodiment, this configuration is not limitative. For example, the fork side insertion part 65h and the fork holder side insertion part 66h may communicate with each other in a radial direction of the hollow cylindrical fork holder 15 (in a direction orthogonal to the second steering axis C2). It should be noted here, however, that it is preferable for the fork side insertion part 65h and the fork holder side insertion part 66h to communicate with each other in the vertical direction, from the viewpoint of permitting the second insertion member to be inserted into and passed through the fork side insertion part 65h and the fork holder side insertion part 66h by its own weight.

In addition, while an example wherein the right link member 42 has screw portions at its front and rear end portions and is fixed by use of lock nuts in a condition where the front and rear screw portions are engaged, in predetermined engaging amounts, with a rear end portion of the lower socket 44b of the front ball joint 42F and a front end portion of the lower socket 44b of the rear ball joint 42R has been described in the above embodiment, this configuration is not limitative. For instance, a configuration may be adopted wherein both the left and right link members 41 and 42 have screw portions at their front and rear end portions and are fixed by use of lock nuts in a condition where the front and rear screw portions are engaged, in predetermined engaging amounts, with the rear end portions of the lower sockets 44b of the front ball joints 41F and 42F and front end portions of the lower sockets 44 of the rear ball joints 41R and 42R. This makes it possible, by slackening the lock nuts and increasing or decreasing the engaging amounts between the lower sockets 44b and the screw portions, to adjust the distance between the front and rear connection parts of the left and right link members 41 and 42. Consequently, at least one of the first steering angle and the second steering angle can be adjusted by adjusting the distances between the front and rear connection parts of the left and right link members 41 and 42 at the time of assembling the vehicle.

Besides, while an example wherein the connection between the rear ball joint 41R and the link rear connection part 38c at the left link member 41 is performed in a rubber mount mode has been described in the above embodiment, this configuration is not limitative. For example, the connection between the front ball joint 41F and the link front connection part 45a at the left link member 41 may be conducted in a rubber mount mode. Here, the front ball joint 41F corresponds to the "fork holder side link part" described in the claims. In other words, at least one of the connection between the rear ball joint 41R and the link rear connection part 38c and the connection between the front ball joint 41F and the link front connection part 45a may be performed in a rubber mount mode.

In addition, while an example wherein the right link member 42 can be contracted and expanded so as to enable adjustment of at least one of the first steering angle and the second steering angle and the connection of the left link member 41 is performed in a rubber mount mode has been described in the above embodiment, this configuration is not restrictive. For example, a configuration may be adopted wherein the left link member 41 can be contracted and expanded such as to enable adjustment of at least one of the first steering angle and the second steering angle and wherein the connection of the right link member 42 is conducted in a rubber mount mode.

Note that the present invention is not limited to the above embodiment. For example, the saddle type vehicle generally includes vehicles of the type in which a rider rides the vehicle while straddling the vehicle body, and includes not only motorcycles (inclusive of motorbikes and scooter type vehicles) and three wheel vehicles (inclusive of front-one-wheel rear-two-wheel vehicles as well as front-two-wheel rear-one-wheel vehicles).

In addition, the configuration in the above embodiment is merely one example of the present invention, and various modifications such as replacement of components of the embodiment by known components are possible without departing from the scope of the gist of the invention.

DESCRIPTION OF REFERENCE SYMBOLS

1: Body frame
10: Front wheel suspension device
11: Front wheel
15: Fork holder
17: Fork
35: Handle post (steering part)
40: Steering angle adjusting mechanism
41: Left link member (second link member)
41F: Front ball joint (fork holder side link part)
41R: Rear ball joint (steering side link part)
42: Right link member (first link member)
60: Linking mechanism
61: First engagement part
62: Second engagement part
63: Handle post side engaging part (steering side engaging part)
63h: Handle post side insertion part (steering side insertion part)
64: Handle support part side engaging part (body frame side engaging part)
64a: Handle support part side sliding part (body frame side sliding part)
64h: Handle support part insertion part (body frame side insertion part)
65: Fork side engaging part
65a: Fork side sliding part
65h: Fork side insertion part
66: Fork holder side engaging part
66h: Fork holder side insertion part
67: Fork holder side steering limiting part
68: Fork side steering limiting part
C1: First steering axis
C2: Second steering axis

What is claimed is:

1. A positioning structure for a front wheel suspension device comprising a fork that supports an axle of a front wheel, a fork holder that supports the fork so as to enable steering and is supported on a body frame, and a steering part that is supported on the body frame so as to enable steering,
wherein the fork is steerable about a second steering axis that is offset to a front side of a first steering axis that is a rotational axis of the steering part,
the positioning structure includes:
a first engagement part which, at the time of assembling the vehicle, engages the steering part and the body frame with each other at a first steering angle that is an angle about the first steering axis, wherein the first engagement part includes a steering part side engaging part formed in the steering part, and a body frame side engaging part formed in the body frame;
a second engagement part which, at the time of assembling the vehicle, engages the fork and the fork holder with each other at a second steering angle that is an angle about the second steering axis, wherein the second engagement part includes a fork side engaging part formed in the fork, and a fork holder side engaging part formed in the fork holder; and
a linking mechanism that links the first engagement part and the second engagement part to each other,
the linking mechanism being provided with a steering adjusting mechanism that puts the first engagement part into engagement by adjusting the first steering angle and puts the second engagement part into engagement by adjusting the second steering angle.

2. The positioning structure for the front wheel suspension device according to claim 1,
wherein the steering part side engaging part is formed with a steering part side insertion part in and through which a first insertion member can be inserted and passed, and
the body frame side engaging part is formed with a body frame side insertion part in and through which the first insertion member can be inserted and passed.

3. The positioning structure for the front wheel suspension device according to claim 2, wherein at the first steering angle, the steering part side insertion part and the body frame side insertion part communicate with each other in a vertical direction.

4. The positioning structure for the front wheel suspension device according to claim 2, wherein the body frame side engaging part is formed with a body frame side sliding part that allows sliding of the first insertion member until the first insertion member is inserted in and passed through the body frame side insertion part.

5. The positioning structure for the front wheel suspension device according to claim 1,
wherein the fork side engaging part is formed with a fork side insertion part in and through which a second insertion member can be inserted and passed, and
the fork holder side engaging part is formed with a fork holder side insertion part in and through which the second insertion member can be inserted and passed.

6. The positioning structure for the front wheel suspension device according to claim 5, wherein at the second steering angle, the fork side insertion part and the fork holder side insertion part communicate with each other in a vertical direction.

7. The positioning structure for the front wheel suspension device according to claim 5,
wherein the fork side engaging part is formed with a fork side sliding part that allows sliding of the second insertion member until the second insertion member is inserted in and passed through the fork side insertion part.

8. The positioning structure for the front wheel suspension device according to claim 7, wherein the fork side insertion part is disposed at a center in a vehicle width direction of the fork side sliding part extending in the vehicle width direction.

9. The positioning structure for the front wheel suspension device according to claim 5,
wherein the fork holder is formed with a fork holder side steering limiting part that limits a steering angle of the fork, and
the fork side engaging part is formed with a fork side steering limiting part capable of contacting the fork holder side steering limiting part.

10. The positioning structure for the front wheel suspension device according to claim 9, wherein the fork side steering limiting part is disposed at each of both end portions in the vehicle width direction of the fork side engaging part extending in the vehicle width direction.

11. The positioning structure for the front wheel suspension device according to claim 1,
wherein the steering adjusting mechanism includes a first link member that extends along a longitudinal vehicle direction on one side in the vehicle width direction and interlinks the steering part and the fork holder, and
the first link member can be contracted and expanded in such a manner as to enable adjustment of at least one of the first steering angle and the second steering angle.

12. The positioning structure for the front wheel suspension device according to claim 11,
wherein the steering adjusting mechanism further includes a second link member that extends in parallel to a longitudinal direction of the first link member on other side in the vehicle width direction and interlinks the steering part and the fork holder,
the second link member is provided with a steering side link part linked to the steering part, and a fork holder side link part linked to the fork holder, and
at least one of connection between the steering side link part and the steering part and connection between the fork holder side link part and the fork holder is performed in a rubber mount mode.

13. The positioning structure for the front wheel suspension device according to claim 2,
wherein the fork side engaging part is formed with a fork side insertion part in and through which a second insertion member can be inserted and passed, and
the fork holder side engaging part is formed with a fork holder side insertion part in and through which the second insertion member can be inserted and passed.

14. The positioning structure for the front wheel suspension device according to claim 13, wherein at the second steering angle, the fork side insertion part and the fork holder side insertion part communicate with each other in a vertical direction.

15. A positioning structure for a front wheel suspension device comprising a fork that supports an axle of a front wheel, a fork holder that supports the fork so as to enable steering and is supported on a body frame, and a steering part that is supported on the body frame so as to enable steering,
wherein the fork is steerable about a second steering axis that is offset to a front side of a first steering axis that is a rotational axis of the steering part,
the positioning structure includes:
a first engagement part which, at the time of assembling the vehicle, engages the steering part and the body frame with each other at a first steering angle that is an angle about the first steering axis;
a second engagement part which, at the time of assembling the vehicle, engages the fork and the fork holder with each other at a second steering angle that is an angle about the second steering axis; and
a linking mechanism that links the first engagement part and the second engagement part to each other,
the linking mechanism being provided with a steering adjusting mechanism that puts the first engagement part into engagement by adjusting the first steering angle and puts the second engagement part into engagement by adjusting the second steering angle,
wherein the steering adjusting mechanism includes a first link member that extends along a longitudinal vehicle direction on one side in the vehicle width direction and interlinks the steering part and the fork holder, and the steering adjusting mechanism further includes a second link member that extends in parallel to a longitudinal direction of the first link member on other side in the vehicle width direction and interlinks the steering part and the fork holder.

16. The positioning structure for the front wheel suspension device according to claim 15,
wherein the first link member can be contracted and expanded in such a manner as to enable adjustment of at least one of the first steering angle and the second steering angle.

17. The positioning structure for the front wheel suspension device according to claim 15,
wherein the first engagement part includes a steering part side engaging part formed in the steering part, and a body frame side engaging part formed in the body frame,
the steering part side engaging part is formed with a steering part side insertion part in and through which a first insertion member can be inserted and passed, and
the body frame side engaging part is formed with a body frame side insertion part in and through which the first insertion member can be inserted and passed.

18. The positioning structure for the front wheel suspension device according to claim 17, wherein at the first steering angle, the steering part side insertion part and the body frame side insertion part communicate with each other in a vertical direction, and
the body frame side engaging part is formed with a body frame side sliding part that allows sliding of the first insertion member until the first insertion member is inserted in and passed through the body frame side insertion part.

19. The positioning structure for the front wheel suspension device according to claim 15,
wherein the second engagement part includes a fork side engaging part formed in the fork, and a fork holder side engaging part formed in the fork holder,
the fork side engaging part is formed with a fork side insertion part in and through which a second insertion member can be inserted and passed, and
the fork holder side engaging part is formed with a fork holder side insertion part in and through which the second insertion member can be inserted and passed.

20. The positioning structure for the front wheel suspension device according to claim 19, wherein at the second steering angle, the fork side insertion part and the fork holder side insertion part communicate with each other in a vertical direction, and the fork side engaging part is formed with a fork side sliding part that allows sliding of the second insertion member until the second insertion member is inserted in and passed through the fork side insertion part.

\* \* \* \* \*